United States Patent
Ye et al.

(10) Patent No.: US 12,085,692 B2
(45) Date of Patent: Sep. 10, 2024

(54) ANTIREFLECTION FILM, OPTICAL ELEMENT, CAMERA MODULE, AND TERMINAL

(71) Applicant: Huawei Technologies Co., Ltd., Shenzhen (CN)

(72) Inventors: Haishui Ye, Shanghai (CN); Feng Yu, Yokohama (JP); Jun Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 487 days.

(21) Appl. No.: 17/606,257

(22) PCT Filed: Apr. 21, 2020

(86) PCT No.: PCT/CN2020/085751
§ 371 (c)(1),
(2) Date: Oct. 25, 2021

(87) PCT Pub. No.: WO2020/216199
PCT Pub. Date: Oct. 29, 2020

(65) Prior Publication Data
US 2022/0196883 A1    Jun. 23, 2022

(30) Foreign Application Priority Data

Apr. 26, 2019 (CN) .......... 201910343323.3
Jun. 18, 2019 (CN) .......... 201910528729.9

(51) Int. Cl.
*G02B 1/118* (2015.01)
*H04M 1/02* (2006.01)

(52) U.S. Cl.
CPC ........ *G02B 1/118* (2013.01); *G02B 2207/101* (2013.01); *H04M 1/0202* (2013.01)

(58) Field of Classification Search
CPC ............. G02B 1/118; G02B 2207/101; H04M 1/0202
(Continued)

(56) References Cited

U.S. PATENT DOCUMENTS

| 2007/0211346 A1 | 9/2007 | Nogushi et al. |
| 2008/0042926 A1 | 2/2008 | Egi et al. |

(Continued)

FOREIGN PATENT DOCUMENTS

| CN | 101479777 A | 7/2009 |
| CN | 101620377 A | 1/2010 |

(Continued)

*Primary Examiner* — Jerry L Brooks
(74) *Attorney, Agent, or Firm* — Conley Rose, P.C.

(57) ABSTRACT

An antireflection film includes a plurality of convex structures formed on a light transmission surface included in an optical waveguide. A maximum radial length of a surface that is of each convex structure and that is close to the light transmission surface is less than a minimum value of a visible light wavelength. The maximum radial length of each convex structure gradually decreases in a direction away from the light transmission surface. A height of each convex structure is greater than or equal to 310 nm. A distance between geometric centers of surfaces that are of two adjacent convex structures and that are close to the light transmission surface is less than or equal to 220 nm.

20 Claims, 25 Drawing Sheets

(58) Field of Classification Search
USPC .......................................................... 359/601
See application file for complete search history.

(56) References Cited

U.S. PATENT DOCUMENTS

| | | | |
|---|---|---|---|
| 2009/0176015 A1 | 7/2009 | Nakanishi et al. |
| 2010/0296177 A1 | 11/2010 | Okuno |
| 2012/0087012 A1 | 4/2012 | Imaoku et al. |
| 2012/0170126 A1 | 7/2012 | Imaoku et al. |
| 2015/0062712 A1 | 3/2015 | Tazawa et al. |
| 2016/0320530 A1 | 11/2016 | Umetani et al. |
| 2018/0100957 A1 | 4/2018 | Ye et al. |

FOREIGN PATENT DOCUMENTS

| | | | |
|---|---|---|---|
| CN | 101923279 A | | 12/2010 |
| CN | 101960559 A | | 1/2011 |
| CN | 102157642 A | | 8/2011 |
| CN | 102241136 A | | 11/2011 |
| CN | 102646751 A | | 8/2012 |
| CN | 103048705 A | | 4/2013 |
| CN | 103336328 A | | 10/2013 |
| CN | 103345007 A | | 10/2013 |
| CN | 102395905 B | | 3/2014 |
| CN | 203502608 U | | 3/2014 |
| CN | 203930102 U | | 11/2014 |
| CN | 102901996 B | | 2/2015 |
| CN | 102066987 B | | 6/2016 |
| CN | 106426992 A | | 2/2017 |
| CN | 106547165 A | | 3/2017 |
| CN | 104583812 B | | 5/2017 |
| CN | 107092044 A | | 8/2017 |
| CN | 108802865 A | | 11/2018 |
| CN | 108828696 A | | 11/2018 |
| CN | 109655971 A | | 4/2019 |
| CN | 111856629 A | | 10/2020 |
| EP | 2293119 A1 | | 3/2011 |
| JP | 2007264594 A | | 10/2007 |
| JP | 2008009408 A | | 1/2008 |
| JP | 2009075539 A | | 4/2009 |
| JP | 2009162965 A | | 7/2009 |
| JP | 2010271533 A | | 12/2010 |
| JP | 2011002762 A | | 1/2011 |
| JP | 2012048239 A | | 3/2012 |
| JP | 2013137485 A | | 7/2013 |
| JP | 2014021146 A | | 2/2014 |
| JP | 2015084024 A | * | 4/2015 |
| JP | 2015184440 A | | 10/2015 |
| WO | 2011013401 A1 | | 2/2011 |
| WO | 2011016270 A1 | | 2/2011 |
| WO | 2017015801 A1 | | 2/2017 |

* cited by examiner

ANTIREFLECTION FILM, OPTICAL ELEMENT, CAMERA MODULE, AND TERMINAL

CROSS-REFERENCE TO RELATED APPLICATIONS

This is a U.S. National Stage of International Patent Application No. PCT/CN2020/085751 filed on Apr. 21, 2020, which claims priority to Chinese Patent Application No. 201910343323.3 filed on Apr. 26, 2019 and Chinese Patent Application No. 201910528729.9 filed on Jun. 18, 2019. All of the aforementioned patent applications are hereby incorporated by reference in their entireties.

TECHNICAL FIELD

This application relates to the field of terminal technologies, and in particular, to an antireflection film, an optical element, a camera module, and a terminal.

BACKGROUND

Currently, an intelligent terminal such as a tablet computer or a smartphone used by a user is generally equipped with a camera, to support the intelligent terminal in photographing. To improve user experience, an intelligent terminal manufacturer improves a structure of the camera provided for the intelligent terminal. However, many problems exist.

For example, in a related technology, when the camera provided for the intelligent terminal takes pictures under a condition with a strong light source, for example, under the sun in a clear day or under a streetlight at night, a ghost problem and a flare problem that can be easily perceived by the user still exist, which affects photographing quality of the camera. A main reason for causing the ghost problem and the flare problem is as follows: Stray light reflected at a surface of an optical element or a mechanical part included in the camera is focused on a CMOS focus plane included in a complementary metal-oxide-semiconductor (complementary metal-oxide-semiconductor, CMOS for short) image sensor, thereby causing the ghost problem and the flare problem on an image collected by the CMOS image sensor.

To resolve the foregoing problem, various optical coatings with low reflectivity are disposed on the optical element included in the camera in the related technologies to weaken the stray light. However, because these optical coatings are limited by a light incidence angle of the optical element, the optical coatings cannot be used to effectively reduce reflectivity of the optical element for oblique incident light.

SUMMARY

Embodiments of this application provide an antireflection film, an optical element, a camera module, and a terminal, to effectively reduce reflectivity of the optical element for normal incident light and oblique incident light without limitation from a shape of the optical element, so that the optical element has extremely low reflectivity.

According to a first aspect, this application provides an antireflection film. The antireflection film includes a plurality of convex structures formed on at least one light transmission surface included in an optical waveguide. A maximum radial length of a surface that is of each convex structure and that is close to the light transmission surface is less than a minimum value of a visible light wavelength. The maximum radial length of each convex structure gradually decreases in a direction away from the light transmission surface. A height of each convex structure is greater than or equal to 310 nm. A distance between geometric centers of surfaces that are of two adjacent convex structures and that are close to the light transmission surface is less than or equal to 220 nm.

The antireflection film provided in this embodiment of this application is formed on the light transmission surface of the optical waveguide, to form an optical element. In this case, the maximum radial length of each convex structure gradually decreases in the direction away from the light transmission surface. A refractive index of each convex structure gradually changes in the direction away from the light transmission surface, to avoid a problem that reflectivity of the optical element increases due to sudden changes of a refractive index of the convex structure and a refractive index of the optical waveguide. However, because the distance between the geometric centers of the surfaces that are of the two adjacent convex structures and that are close to the light transmission surface and the maximum radial length of the surface that is of each convex structure and that is close to the light transmission surface are both less than the minimum value of the visible light wavelength, identification on each convex structure and space between two adjacent convex structures is not implemented for visible light radiated to the antireflection film, and therefore, the reflectivity of the optical element for the visible light can be reduced by using the antireflection film. In addition, when the height of each convex structure is greater than or equal to 310 nm, and the distance between the geometric centers of the surfaces that are of the two adjacent convex structures and that are close to the light transmission surface is less than or equal to 220 nm, without limitation of the shape of the optical element, the antireflection film can be used to adjust and control the reflectivity of the optical element for the visible light regardless of whether the visible light is radiated to the optical element in a normal incidence manner or an oblique incidence manner, so that the optical element has the extremely low reflectivity for the visible light.

With reference to the first aspect, in a first possible implementation of the first aspect, the height of each convex structure is further less than or equal to 450 nm, and the distance between the geometric centers of the surfaces that are of the two adjacent convex structures and that are close to the light transmission surface is greater than or equal to 160 nm. In this way, when it is ensured that the refractive index of each convex structure changes slowly in the direction away from the light transmission surface, the convex structure is easily manufactured.

With reference to the first aspect, in a second possible implementation of the first aspect, a maximum radial length of a surface that is of each convex structure and that is away from the light transmission surface is 0 times to 0.3 times the maximum radial length of the surface that is of the corresponding convex structure and that is close to the light transmission surface.

When the maximum radial length of the surface that is of each convex structure and that is away from the light transmission surface is 0 times the maximum radial length of the surface that is of the corresponding convex structure and that is close to the light transmission surface, and an area of the surface that is of each convex structure and that is away from the light transmission surface is 0, each convex structure is essentially a needle-like convex structure that gradually becomes thick in the direction away from the light transmission surface. In this case, the refractive index of each convex structure for the visible light gradually decreases in the direction away from the light transmission surface until the refractive index of the convex structure is equal to an air refractive index. In other words, an equivalent refractive index of the antireflection film gradually decreases in the direction away from the light transmission surface until the equivalent refractive index of the antireflection film is equal to the air refractive index. In this way, when the visible light can be radiated from the air to the optical element, the antireflection film can gradually refract the visible light in a more natural manner, to better adjust and control the reflectivity of the optical element, so that the optical element has the extremely low reflectivity.

When a ratio of the maximum radial length of the surface that is of each convex structure and that is away from the light transmission surface to the maximum radial length of the surface that is of the corresponding convex structure and that is close to the light transmission surface is greater than 0 and less than or equal to 0.3, in this case, the area of the surface that is of each convex structure and that is away from the light transmission surface is greater than 0. Therefore, the antireflection film can be used to adjust and control the reflectivity of the optical element, and precision of manufacturing each convex structure is also reduced, to reduce difficulty in manufacturing the antireflection film. In addition, the maximum radial length of each convex structure gradually decreases in the direction away from the light transmission surface. Therefore, when the maximum radial length of the surface that is of each convex structure and that is away from the light transmission surface is greater than 0 times or equal to 0.3 times the maximum radial length of the surface that is of the corresponding convex structure and that is close to the light transmission surface, the height of each convex structure may be properly controlled, so that the refractive index of each convex structure in the direction away from the light transmission surface gradually decreases. In this way, when it is ensured that the refractive index of the convex structure is reduced, the difficulty in manufacturing each convex structure can be further reduced.

With reference to the first aspect, in a third possible implementation of the first aspect, a profile of each convex structure is a tapered profile, a Gaussian profile, or a parabolic profile. This is not limited thereto. For example, when the profile of each convex structure is the tapered profile, each convex structure is a tapered convex structure, for example, a cone convex structure, a quadrangular pyramid convex structure, or a hexagonal pyramid convex structure. This is not listed herein. Certainly, to reduce the manufacturing difficulty, when the convex structure is actually manufactured, the manufactured convex structure may also be a frustum convex structure similar to the tapered convex structure.

With reference to the first aspect or the third possible implementation of the first aspect, in a fourth possible implementation of the first aspect, a ratio of the height of each convex structure to the maximum radial length of the surface that is of the corresponding convex structure and that is close to the light transmission surface is greater than or equal to 1 to 3, to optimize a rate at which the refractive index of each convex structure decreases in the direction away from the light transmission surface. Therefore, when the visible light is radiated to the optical element, a problem that the reflectivity of the optical element increases due to a change of the refractive index of the convex structure can be further avoided, to ensure that the reflectivity of the optical element is further reduced.

With reference to the first aspect or any one of the first to the fourth possible implementations of the first aspect, in a fifth possible implementation of the first aspect, a distribution manner of the plurality of convex structures is an array distribution manner such as a dense stacking distribution manner. When the dense stacking distribution manner is applied to the plurality of convex structures, the light transmission surface included in the optical waveguide may be fully used, so that the plurality of convex structures are evenly formed on the light transmission surface as many as possible. In this way, a homogeneous film layer can be equivalently formed for the antireflection film, to further reduce the reflectivity of the optical element.

With reference to the fifth possible implementation of the first aspect, in a sixth possible implementation of the first aspect, the dense stacking distribution manner may be a quadrilateral dense stacking distribution manner, a hexagonal dense stacking distribution manner, or the like. This is not listed herein.

With reference to the first aspect or any one of the first to the sixth possible implementations of the first aspect, in a seventh possible implementation of the first aspect, the maximum radial length of the surface that is of each convex structure and that is close to the light transmission surface is equal to the distance between the geometric centers of the surfaces that are of the two adjacent convex structures and that are close to the light transmission surface. Therefore, the distribution manner of the plurality of convex structures is the dense stacking distribution manner. The light transmission surface included in the optical waveguide is fully used, so that the plurality of convex structures are evenly formed on the light transmission surface as many as possible. In this way, the homogeneous film layer can be equivalently formed for the antireflection film, to further reduce the reflectivity of the optical element.

With reference to the first aspect or any one of the first to the seventh possible implementations of the first aspect, in an eighth possible implementation of the first aspect, the distance between the geometric centers of the surfaces that are of the two adjacent convex structures and that are close to the light transmission surface is 160 nm to 200 nm, to further reduce the distance between the two adjacent convex structures. Therefore, the convex structures are distributed on the light transmission surface as many as possible, to better reduce the reflectivity of the optical element for the visible light by using the antireflection film.

With reference to the first aspect or any one of the first to the eighth possible implementations of the first aspect, in a ninth possible implementation of the first aspect, a thickness of the antireflection film is 310 nm to 450 nm. In other words, in this case, the thickness of the antireflection film is essentially the height of the convex structure.

With reference to the first aspect or any one of the first to the eighth possible implementations of the first aspect, in a tenth possible implementation of the first aspect, the antireflection film further includes an adhesive layer. The adhesive layer is located on the surfaces that are of the plurality of convex structures and that are close to the light transmission surface. In this case, when the antireflection film is formed on the light waveguide, the adhesive layer is first formed on the light transmission surface, and then the plurality of convex structures are formed on a surface that is of the adhesive layer and that is away from the light transmission surface. In this way, the adhesive layer can be used to not only improve bonding between the light transmission surface and the plurality of convex structures, but also protect the light transmission surface. Therefore, damage caused to the light transmission surface due to a problem such as a manufacturing error is avoided when the plurality of convex structures are directly manufactured on the light transmission surface by using a manufacturing process such as an embossing technique. A height of the adhesive layer is less than 10 nm. In this way, an effect of the adhesive layer to a light transmittance is minimized, and the adhesive layer formed on the light transmission surface has good flatness with no obvious wrinkles, so that the adhesive layer and the light transmission surface are tightly fitted to each other.

With reference to the tenth possible implementation of the first aspect, in an eleventh possible implementation of the first aspect, a difference between a refractive index of a material included in the adhesive layer and a refractive index of a material included in each convex structure is −0.2 to 0.2, to ensure that a refractive index of the adhesive layer is relatively close to a refractive index of the convex structure, thereby avoiding a problem that the reflectivity of the optical element for the light increases due to a refractive index change.

With reference to the tenth or the eleventh possible implementation of the first aspect, in a twelfth possible implementation of the first aspect, a total light transmittance of the adhesive layer and/or a total light transmittance of each convex structure are/is greater than 90%, to reduce a loss of the visible light when the visible light passes through the antireflection film.

With reference to any one of the tenth to the twelfth possible implementations of the first aspect, in a thirteenth possible implementation of the first aspect, a thickness of the antireflection film is greater than 320 nm and less than 460 nm, to reduce a loss rate of light passing through the adhesive layer and ensure that the convex structures can be stably formed on the light transmission surface.

With reference to any one of the tenth to the thirteenth possible implementations of the first aspect, in a fourteenth possible implementation of the first aspect, the material included in the adhesive layer is a silane material such as a modified silane adhesive. For example, the modified silane adhesive may be various silane terminated polyether adhesives.

With reference to the first aspect or any one of the first to the fourteenth possible implementations of the first aspect, in a fifteenth possible implementation of the first aspect, the plurality of convex structures are formed on the light transmission surface by using an embossing technique, so that manufacturing of the plurality of convex structures can be completed at a time, thereby improving a speed of manufacturing the antireflection film.

With reference to the fifteenth possible implementation of the first aspect, in a sixteenth possible implementation of the first aspect, the convex structure is a convex structure formed through curing of a photocurable adhesive or curing of a thermocurable adhesive. When the convex structure is the convex structure formed through the curing of the photocurable adhesive, in a process of embossing the photocurable adhesive by using a transparent mold, embossing of the convex structure may be completed through light radiation. In this case, the embossing technique and the photocuring process are continuously performed, to continuously manufacture the convex structures. When the convex structure is the convex structure formed through the curing of the thermocurable adhesive, in a process of embossing the photocurable adhesive by using a mold, the convex structure obtained after the embossing is heated, so that the convex structure is quickly cured.

According to a second aspect, this application provides an optical element. The optical element includes an optical waveguide and the antireflection film described in the first aspect or any possible implementation of the first aspect. The antireflection film is located on at least one light transmission surface included in the optical waveguide.

The optical element provided in this embodiment of this application includes not only the optical waveguide but also the antireflection film described in the first aspect or any possible implementation of the first aspect. The antireflection film includes a plurality of convex structures formed on at least one light transmission surface included in the optical waveguide. A maximum radial length of each convex structure gradually decreases in a direction away from the light transmission surface. A refractive index of each convex structure gradually changes in the direction away from the light transmission surface, to avoid a problem that reflectivity of the optical element increases due to sudden changes of a refractive index of the convex structure and a refractive index of the optical waveguide. In addition, because a distance between geometric centers of surfaces that are of two adjacent convex structures and that are close to the light transmission surface and a maximum radial length of a surface that is of each convex structure and that is close to the light transmission surface are both less than a minimum value of a visible light wavelength, identification on each convex structure and space between two adjacent convex structures is not implemented for visible light radiated to the antireflection film, and therefore, reflectivity of the optical element for the visible light can be reduced by using the antireflection film. It is found through analysis that, when a height of each convex structure is greater than or equal to 310 nm, and the distance between the geometric centers of the surfaces that are of the two adjacent convex structures and that are close to the light transmission surface is less than or equal to 220 nm, without limitation of a shape of the optical element, the antireflection film can be used to adjust and control the reflectivity of the optical element for the visible light regardless of whether the visible light is radiated to the optical element in a normal incidence manner or an oblique incidence manner, so that the optical element has the extremely low reflectivity for the visible light.

With reference to the second aspect, in a first possible implementation of the second aspect and a second possible implementation of the second aspect, a difference between a refractive index of a material included in each convex structure and a refractive index of a material included in the optical waveguide is −0.2 to 0.2, to ensure that the refractive index of the material included in each convex structure is relatively close to the refractive index of the material included in the optical waveguide, thereby avoiding a problem that the reflectivity of the optical element increases due to the sudden changes of the refractive index of the convex structure and the refractive index of the optical waveguide.

With reference to the second aspect or the first or the second possible implementation of the second aspect, in a third possible implementation of the second aspect, the antireflection film is the antireflection film described in the first aspect or any one of the ninth to the thirteenth possible implementations of the first aspect. A difference between a refractive index of a material included in an adhesive layer included in the antireflection film and the refractive index of the material included in the optical waveguide is −0.2 to 0.2, so that the refractive index of the material included in the adhesive layer is relatively close to the refractive index of the material included in the optical waveguide, thereby avoiding a problem that the reflectivity of the optical element increases due to a sudden change between the refractive index of the adhesive structure and the refractive index the optical waveguide.

With reference to the second aspect or the first to the third possible implementations of the second aspect, in a fourth possible implementation of the second aspect, maximum reflectivity of the optical element is less than or equal to 0.5% when an incident angle is equal to 0°, and the maximum reflectivity of the optical element is less than or equal to 1% when the incident angle is less than or equal to 40°. In this way, when the optical element is applied to a camera module, a ghost problem and a flare problem do not occur in a picture taken by the camera module when a light incidence angle is less than or equal to 40°.

With reference to the second aspect or the first to the fourth possible implementation of the second aspect, in a fifth possible implementation of the second aspect, a total light transmittance of the optical waveguide and/or a total light transmittance of the antireflection film are/is greater than 90%, to reduce a loss of the visible light when the visible light passes through the optical element.

With reference to the second aspect or any one of the first to the fifth possible implementations of the second aspect, in a sixth possible implementation of the second aspect, the light transmission surface on which the plurality of convex structures are formed is a curved light transmission surface or a flat light transmission surface. The curved light transmission surface is a camber-shaped light transmission surface or a wave-shaped light transmission surface, or may be another irregular curved light transmission surface.

It should be understood that the antireflection film is the antireflection film described in any one of the tenth to the fourteenth possible implementations of the first aspect. When the antireflection film is formed on the curved light transmission surface, the adhesive layer included in the antireflection film is a curved incident surface and is fitted to a profile of the light transmission surface, to increase fitting performance between the adhesive layer and the light transmission surface, so that the adhesive layer and the light transmission surface are in close contact with each other. When the light transmission surface on which the antireflection film is formed is the flat light transmission surface, the adhesive layer included in the antireflection film is a flat incident surface, to increase fitting performance between the adhesive layer and the light transmission surface, so that the adhesive layer and the light transmission surface are in close contact with each other.

With reference to the second aspect or any one of the first to the fifth possible implementations of the second aspect, in a seventh possible implementation of the second aspect, the light waveguide is a protective diaphragm, a lens, or an infrared cut-off filter. The protective diaphragm is any optical glass such as ultraviolet fused silica glass, infrared fused silica glass, or calcium fluoride. This is not listed herein. The lens is various convex lenses made of various materials. The infrared cut-off filter is blue glass but is not limited thereto. Any material that can implement infrared filtering can be used.

With reference to the second aspect or any one of the first to the seventh possible implementations of the second aspect, in an eighth possible implementation of the second aspect, the optical waveguide includes a first light transmission surface and a second light transmission surface that are disposed opposite to each other. The antireflection film is formed on both the first light transmission surface and the second light transmission surface, to further reduce the reflectivity of the optical element for the visible light.

With reference to the second aspect or any one of the first to the eighth possible implementations of the second aspect, in a ninth possible implementation of the second aspect, the optical waveguide includes a first light transmission surface and a second light transmission surface that are disposed opposite to each other. The antireflection film is formed on the first light transmission surface, and an antireflection coating is formed on the second light transmission surface.

With reference to the ninth possible implementation of the second aspect, in a tenth possible implementation of the second aspect, the antireflection coating includes a first material layer and a second material layer that are alternately disposed in a direction close to the second light transmission surface. A refractive index of the first material layer and a refractive index of the second material layer are both relatively low, and the refractive index of the first material layer is less than the refractive index of the second material layer. For example, the first material layer is a magnesium fluoride material layer or a silicon dioxide material layer but is not limited thereto; and the second material layer is a titanium dioxide material layer but is not limited thereto.

According to a third aspect, this application provides a camera module. The camera module includes at least one first-type optical element. The first-type optical element is the optical element described in the second aspect or any possible implementation of the second aspect.

The first-type optical element included in the camera module provided in this embodiment of this application is the optical element described in the second aspect or any possible implementation of the second aspect, so that the first-type optical element includes not only an optical waveguide but also the antireflection film described in the first aspect or any possible implementation of the first aspect. The antireflection film includes a plurality of convex structures formed on at least one light transmission surface included in the optical waveguide. A maximum radial length of each convex structure gradually decreases in a direction away from the light transmission surface. A refractive index of each convex structure gradually changes in the direction away from the light transmission surface, to avoid a problem that reflectivity of the optical element increases due to sudden changes of a refractive index of the convex structure and a refractive index of the optical waveguide. In addition, because a distance between geometric centers of surfaces that are of two adjacent convex structures and that are close to the light transmission surface and a maximum radial length of a surface that is of each convex structure and that is close to the light transmission surface are both less than a minimum value of a visible light wavelength, identification on each convex structure and space between two adjacent convex structures is not implemented for visible light radiated to the antireflection film, and therefore, reflectivity of the optical element for the visible light can be reduced by using the antireflection film. It is found through analysis that, when a height of each convex structure is greater than or equal to 310 nm, and the distance between the geometric centers of the surfaces that are of the two adjacent convex structures and that are close to the light transmission surface is less than or equal to 220 nm, without limitation of a shape of the optical element, the antireflection film can be used to adjust and control the reflectivity of the optical element for the visible light regardless of whether the visible light is radiated to the optical element in a normal incidence manner or an oblique incidence manner, so that the optical element has the extremely low reflectivity for the visible light.

With reference to the third aspect, in a first possible implementation of the third aspect, the camera module further includes at least one second-type optical element. The second-type optical element also includes an optical waveguide and an antireflection film. However, the antireflection film is the antireflection coating described in the eighth or the ninth possible implementation of the second aspect, to improve a light collection rate of the camera module.

With reference to the first possible implementation of the third aspect, in a third possible implementation of the third aspect, the camera module further includes an image sensor. The first-type optical element and the second-type optical element are located in a direction in which a sensing surface of the image sensor is located, so that the visible light can be collected by the image sensor after passing through the optical element. However, because the first-type optical element has extremely low reflectivity for the visible light, the image sensor can collect almost all visible light reflected by scenery photographed by the camera module, to improve definition of the scenery photographed by the camera module, thereby avoiding a ghost problem and a flare problem.

According to a fourth aspect, this application provides a terminal. The terminal includes the camera module described in the third aspect or the first or the second possible implementation of the third aspect.

In the terminal provided in this application, a first-type optical element included in the camera module includes not only an optical waveguide, but also the antireflection film described in the first aspect or any possible implementation of the first aspect. The antireflection film includes a plurality of convex structures formed on at least one light transmission surface included in the optical waveguide. A maximum radial length of each convex structure gradually decreases in a direction away from the light transmission surface. A refractive index of each convex structure gradually changes in the direction away from the light transmission surface, to avoid a problem that reflectivity of the optical element increases due to sudden changes of a refractive index of the convex structure and a refractive index of the optical waveguide. In addition, because a distance between geometric centers of surfaces that are of two adjacent convex structures and that are close to the light transmission surface and a maximum radial length of a surface that is of each convex structure and that is close to the light transmission surface are both less than a minimum value of a visible light wavelength, identification on each convex structure and space between two adjacent convex structures is not implemented for visible light radiated to the antireflection film, and therefore, reflectivity of the optical element for the visible light can be reduced by using the antireflection film. It is found through analysis that, when a height of each convex structure is greater than or equal to 310 nm, and the distance between the geometric centers of the surfaces that are of the two adjacent convex structures and that are close to the light transmission surface is less than or equal to 220 nm, without limitation of a shape of the optical element, the antireflection film can be used to adjust and control the reflectivity of the optical element for the visible light regardless of whether the visible light is radiated to the optical element in a normal incidence manner or an oblique incidence manner, so that the optical element has the extremely low reflectivity for the optical light, to ensure definition of a picture taken by the terminal, thereby avoiding a ghost problem and a flare problem.

With reference to the fourth aspect, in a first possible implementation of the fourth aspect, the terminal further includes a processor, a memory, and a display screen. The processor is separately electrically connected to the camera module, the memory, and the display screen. The memory is configured to store a computer instruction. When the computer instruction is run, the processor is enabled to process at least image data transmitted by the camera module, and certainly also process internal data of the terminal or process data transmitted by an external device when the external device accesses the terminal. The display is configured to display at least an image collected by the camera module, and certainly also display an image internally stored in the terminal or display an image transmitted by the external device when the external device accesses the terminal.

It should be understood that when the camera module is the camera module described in the third possible implementation of the third aspect, the processor is electrically connected to the image sensor included in the camera module, to process, by using the processor, image data collected by the image sensor.

According to a fifth aspect, this application provides a method for manufacturing an optical element. The method for manufacturing an optical element includes:

providing an optical waveguide; and forming, on at least one light transmission surface included in the optical waveguide, the antireflection film described in the first aspect or any possible implementation of the first aspect.

The optical element manufactured by using the method for manufacturing an optical element provided in this embodiment of this application includes not only the optical waveguide but also the antireflection film described in the first aspect or any possible implementation of the first aspect. The antireflection film includes a plurality of convex structures formed on the at least one light transmission surface included in the optical waveguide. A maximum radial length of each convex structure gradually decreases in a direction away from the light transmission surface. A refractive index of each convex structure gradually changes in the direction away from the light transmission surface, to avoid a problem that reflectivity of the optical element increases due to sudden changes of a refractive index of the convex structure and a refractive index of the optical waveguide. In addition, because a distance between geometric centers of surfaces that are of two adjacent convex structures and that are close to the light transmission surface and a maximum radial length of a surface that is of each convex structure and that is close to the light transmission surface are both less than a minimum value of a visible light wavelength, identification on each convex structure and space between two adjacent convex structures is not implemented for visible light radiated to the antireflection film, and therefore, reflectivity of the optical element for the visible light can be reduced by using the antireflection film. It is found through analysis that, when a height of each convex structure is greater than or equal to 310 nm, and the distance between the geometric centers of the surfaces that are of the two adjacent convex structures and that are close to the light transmission surface is less than or equal to 220 nm, without limitation of a shape of the optical element, the antireflection film can be used to adjust and control the reflectivity of the optical element for the visible light regardless of whether the visible light is radiated to the optical element in a normal incidence manner or an oblique incidence manner, so that the optical element has the extremely low reflectivity for the optical light, to ensure definition of a picture taken by a terminal, thereby avoiding a ghost problem and a flare problem.

With reference to the fifth aspect, in a first possible implementation of the fifth aspect, the forming the antireflection film on at least one light transmission surface included in the optical waveguide includes:

forming a curable material layer on the at least one light transmission surface included in the optical waveguide;

embossing the curable material layer by using an embossing mold to obtain a plurality of convex structures; and curing the plurality of convex structures.

With reference to the fifth aspect or the first possible implementation of the fifth aspect, in a second possible implementation of the fifth aspect, the light transmission surface is a curved light transmission surface, and the embossing the curable material layer by using an embossing mold to obtain a plurality of convex structures includes:

providing the embossing mold, where the embossing mold includes an optical waveguide jig and an elastic molding layer, the optical waveguide jig has a mold forming surface that is consistent with a profile of the light transmission surface, the elastic molding layer is formed on the mold forming surface, and the elastic molding layer includes a plurality of elastic dies configured to form the convex structures; and embossing the curable material layer by using the plurality of elastic dies included in the embossing mold to obtain the plurality of convex structures.

It should be understood that the elastic molding layer is tightly bonded to the optical waveguide jig, and no gap exists between the elastic molding layer and the optical waveguide jig. Therefore, when the mold forming surface included in the optical waveguide jig is consistent with the profile of the light transmission surface, the plurality of convex structures with the same shape and the same size can be formed on the light transmission surface when the plurality of elastic dies are used to emboss the curable material layer. In addition, it is ensured that the plurality of convex structures are tightly bonded to the light transmission surface. However, because the plurality of elastic dies are elastic, the plurality of elastic dies do not damage the optical waveguide when the plurality of elastic dies are used to emboss the curable material layer. Consistency between the mold forming surface and the profile of the light transmission surface may be determined based on profile precision. When profile precision of the mold forming surface is less than or equal to 1 µm, the mold forming surface is defined to be consistent with the profile of the light transmission surface.

With reference to the fifth aspect or the first possible implementation of the fifth aspect, in a third possible implementation of the fifth aspect, the light transmission surface is a flat light transmission surface, and the embossing the curable material layer by using an embossing mold to obtain a plurality of convex structures includes:

providing the embossing mold, where the embossing mold includes a roller and an elastic molding layer formed on a surface of the roller, and the elastic molding layer includes a plurality of elastic dies configured to form the convex structures; and embossing the curable material layer by using the plurality of elastic dies included in the embossing mold to obtain the plurality of convex structures.

It should be understood that when the light transmission surface is the flat light transmission surface, it is required to roll the embossing mold on a surface of the curable material layer under specific pressure. In this way, the plurality of elastic dies of the elastic molding layer on the surface of the roller included in the embossing mold may be used to obtain the plurality of convex structures through embossing the curable material layer. Therefore, the embossing mold may be used to conveniently manufacture the convex structures.

With reference to the fifth aspect or any one of the first to the third possible implementations of the fifth aspect, in a fourth possible implementation of the fifth aspect, a curable material included in the curable material layer is a photocurable material, the embossing mold is a transparent embossing mold, and the curing the plurality of convex structures includes:

curing the plurality of convex structures in a photocuring manner.

With reference to the fifth aspect or any one of the first to the third possible implementations of the fifth aspect, in a fifth possible implementation of the fifth aspect, a curable material included in the curable material layer is a thermocurable material, and the curing the plurality of convex structures includes:

curing the plurality of convex structures in a thermocuring manner.

With reference to the fifth aspect or any one of the first to the fifth possible implementations of the fifth aspect, before the forming the antireflection film on at least one light transmission surface included in the optical waveguide, after the providing an optical waveguide, the method for manufacturing an optical element further includes:

forming an adhesive layer on the at least one light transmission surface included in the light waveguide, where the adhesive layer is configured to bond the light transmission surface and the plurality of convex structures, to ensure that the plurality of convex structures can be stably formed on the light transmission surface and avoid damage caused to the light transmission surface when the plurality of convex structures are directly manufactured on the light transmission surface.

DESCRIPTION OF EMBODIMENTS

Figure 1:
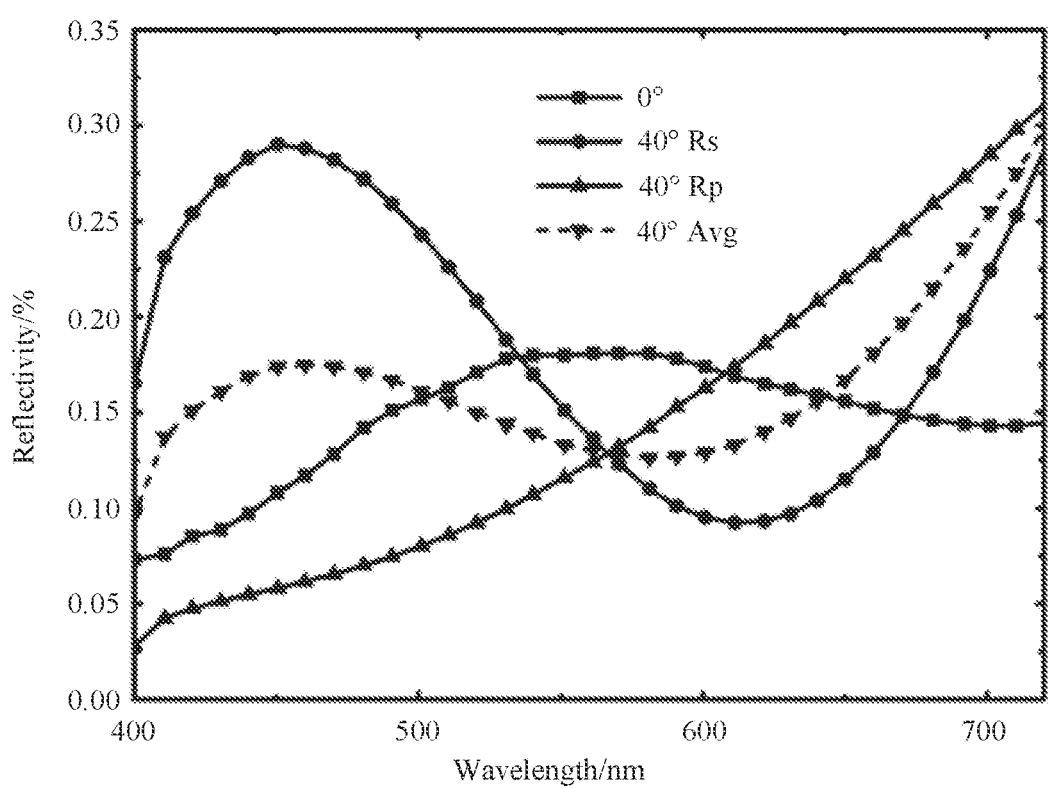
FIG. 1 is reflectivity curves of a lens on which an optical coating is formed for visible light.

In addition, in embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example", "for example", or the like is intended to present a relative concept in a specific manner.

Embodiments of this application relate to an antireflection film, an optical element, a camera module, and a terminal. The following briefly describes related concepts in the embodiments of this application.

"At least one" indicates one or more, and "a plurality of" indicates two or more. The term "and/or" describes an association relationship for describing associated objects and represents that three relationships may exist. For example, A and/or B may represent the following three cases; Only A exists, both A and B exist, and only B exists, where A and B may be singular or plural. In the descriptions of this application, unless otherwise stated, "/" means "or". For example, A/B may indicate A or B. "At least one of the following" or a similar expression thereof means any combination of these items, including any combination of a single item or a plurality of items.

A p wave is a lightwave whose photoelectric field direction is parallel to an incident surface.

An s wave is a lightwave whose photoelectric field direction is perpendicular to an incident surface.

An optical waveguide is a dielectric apparatus, also referred to as a dielectric optical waveguide, that guides propagation of a lightwave. The lightwave herein includes not only a visible lightwave, but also a non-visible lightwave such as an ultraviolet lightwave or an infrared lightwave.

A light transmission surface is a surface that is of an optical waveguide and on which light passes through the optical waveguide. For example, an in-light surface of the optical waveguide and an out-light surface of the optical waveguide are both light transmission surfaces included in the optical waveguide.

Visible light is a part that can be sensed by a human eye in an electromagnetic spectrum. A visible spectrum does not have an accurate range. Generally, a wavelength of an electromagnetic wave that can be sensed by the human eye is between 400 nm and 760 nm. However, some people can sense an electromagnetic wave with a wavelength between 380 nm and 780 nm.

Normal incidence (normal incidence) indicates an incidence case in which a wavefront normal of an incident wave is perpendicular to a medium demarcation surface. Herein, an incident angle is equal to 0°.

Oblique incidence indicates an incidence case in which an included angle between a wavefront normal of an incident wave and a medium demarcation surface is greater than 0° and less than 90°. Herein, an incident angle is greater than 0° and less than 90°.

A total light transmittance is a transmittance of visible light (from near-infrared to near-ultraviolet), rather than a transmittance of light at a single frequency.

A refractive index is a ratio of a velocity of light in a vacuum (generally, a velocity in the air is used because the velocity in the air is almost the same as the velocity in the vacuum) to a velocity of light in a material. A higher refractive index of the material indicates a stronger capability of refracting the incident light.

An equivalent refractive index is a refractive index obtained through calculation based on an equivalent refractive index model of an antireflection film. Herein, the equivalent refractive index model is constructed based on an equivalent dielectric theory.

Profile precision is a deviation amount between a precise polished surface and an ideal plane. The profile precision is indicated by using two parameters: a PV value and an RMS value. The PV value is a peak to valley value (a difference between a peak value and a valley value), and the RMS value is a root mean square (a root mean square value). Based on the experience, the RMS value is about ⅓ of the PV value. Generally, the PV value is used to indicate the profile precision.

A dense stacking distribution manner is a dot matrix arrangement manner. Units included in a dot matrix structure formed in this arrangement manner are densely arranged in a plane, to implement best space utilization of the plane.

A surface that is of a convex structure and that is close to a light transmission surface is a surface that is of the convex structure, that is parallel to the light transmission surface, and that has the smallest distance to the light transmission surface.

A surface that is of a convex structure and that is away from a light transmission surface is a surface that is of the convex structure, that is parallel to the light transmission surface, and that has the largest distance to the light transmission surface.

A maximum radial length of a convex structure is a maximum length of a formed shape of a section in a direction in which the convex structure is parallel to the light transmission surface. For example, if the section is a circle, the maximum radial length of the convex structure is a diameter of the circle. For another example, if the section is a square, the maximum radial length of the convex structure is a diagonal of the square. For still another example, if the section is an irregular polygon, the maximum radial length of the convex structure is a distance between two points that are included in the irregular polygon and that are farthest away from each other.

It should be understood that, because the maximum radial length of the convex structure gradually decreases in a direction away from the light transmission surface, the maximum radial length of the shape of the section that is of the convex structure and that is parallel to the light transmission surface is related to a distance between the section and the light transmission surface. A greater distance between the section and the light transmission surface corresponds to a smaller maximum radial length of the section that is of the convex structure and that is parallel to the light transmission surface.

A geometric center is classified into a geometric center of a regular graph and a geometric center of an irregular graph. For the regular graph, the geometric center of the regular graph is well known. For example, a geometric center of a circle is a center of the circle, a geometric center of a square is an intersection point of two diagonals, and a geometric center of a triangle is a center of gravity of the triangle. For the irregular graph, the geometric center of the irregular graph is determined as follows: selecting any three points at edges of the irregular graph, then drawing circles based on the three points, and using an intersection point of three arcs as a center point.

A lens is an aspherical optical element made of a transparent material.

An infrared cut-off filter is also referred to as a heat absorbing filter, and is a filter configured to filter out an infrared band.

A protective diaphragm is an optical element for protecting a lens, and is disposed on an outermost side of the lens.

An image sensor is an apparatus that converts an optical image on a light-sensitive surface into an electrical signal in corresponding proportion to the optical image by using an optical-to-electrical conversion function of a photoelectric device.

A CMOS image sensor is a typical solid-state imaging sensor. The CMOS image sensor generally includes several parts such as an image-sensitive unit array, a row driver, a column driver, sequential control logic, analog-to-digital conversion, a data bus output interface, and a control interface. These parts are generally integrated on the same silicon chip. A working process of the CMOS image sensor is generally divided into the following parts: resetting, optical-to-electrical conversion, integral, and readout.

In related technologies, various optical coatings with low reflectivity are disposed on an optical element included in a camera module to weaken stray light. However, because these optical coatings are limited by a light incidence angle of the optical element, the optical coatings cannot be used to effectively reduce reflectivity of the optical element for oblique incident light. FIG. 1 is reflectivity curves of a lens on which an optical coating is formed for visible light. Herein, 40° Rs represents a reflectivity curve of an s wave incident at an incident angle of 40°. 40° Rp represents a reflectivity curve of a p wave incident at an incident angle of 40° and 40° Avg represents a mean reflectivity curve of an s wave and a p wave incident at an incident angle of 40°, and indicates a reflectivity curve of visible light (that is, natural light). Herein, 0° represents a reflectivity curve of visible light at an incident angle of 0°. It can be found through analyzing FIG. 1 that the optical coating can be used to effectively reduce reflectivity of the lens for normal incident light, but cannot be used to effectively reduce reflectivity of the lens for 40° oblique incident light.

Figure 2:
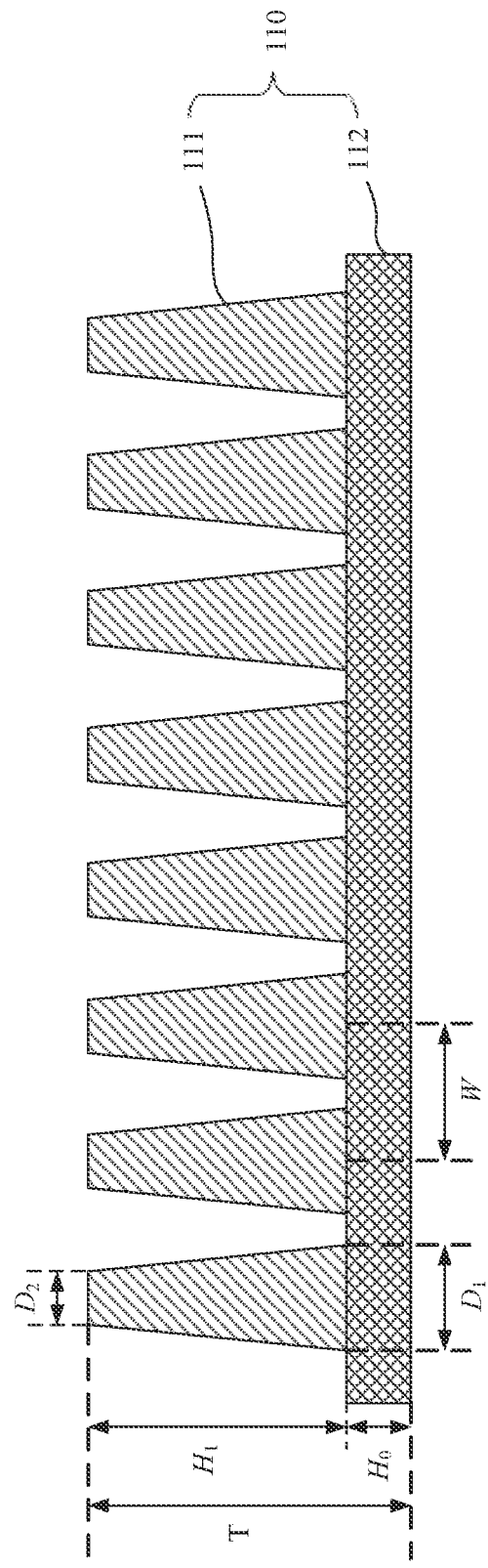
FIG. 2 is a schematic structural diagram 1 of an antireflection film according to an embodiment of this application.
Figure 5:
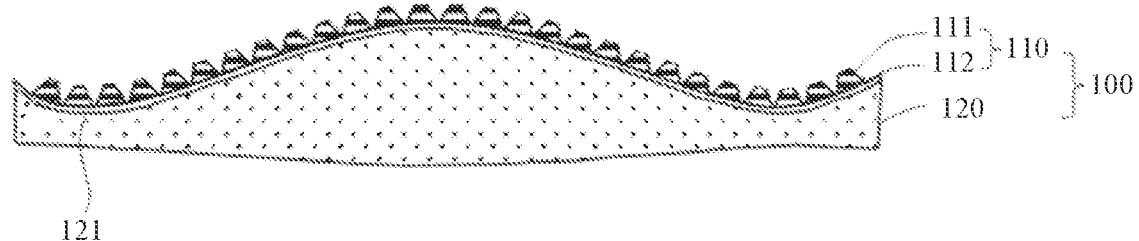
FIG. 5 is a schematic structural diagram of a second optical element including the antireflection film shown in FIG. 2 according to an embodiment of this application.
Figure 6:
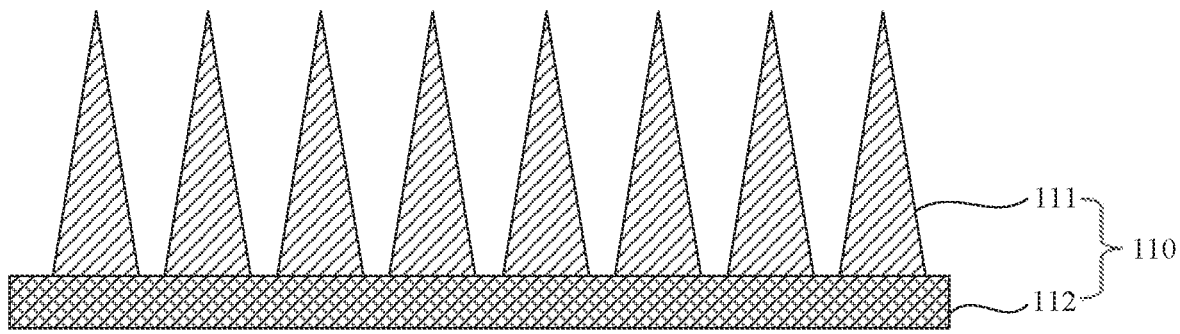
FIG. 6 is a schematic structural diagram 2 of an antireflection film according to an embodiment of this application.

For the foregoing problem, as shown in FIG. 2 or FIG. 6, an embodiment of this application provides an antireflection film 110. The antireflection film 110 includes a plurality of convex structures 111. As shown in FIG. 3, FIG. 5, FIG. 7, or FIG. 8, the plurality of convex structures 111 are formed on at least one light transmission surface 121 included in an optical waveguide 120. It should be understood that the antireflection film 110 provided in this embodiment of this application does not include the optical waveguide shown in FIG. 3, and the optical waveguide is an object to which the antireflection film is applied.

Figure 3:
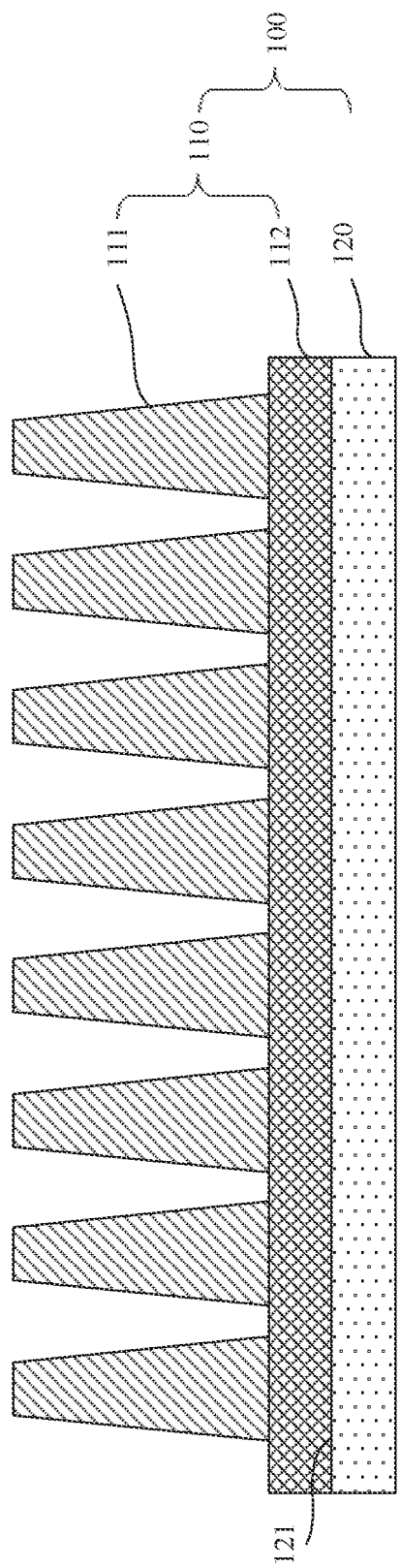
FIG. 3 is a schematic structural diagram of a first optical element including the antireflection film shown in FIG. 2 according to an embodiment of this application.
Figure 7:
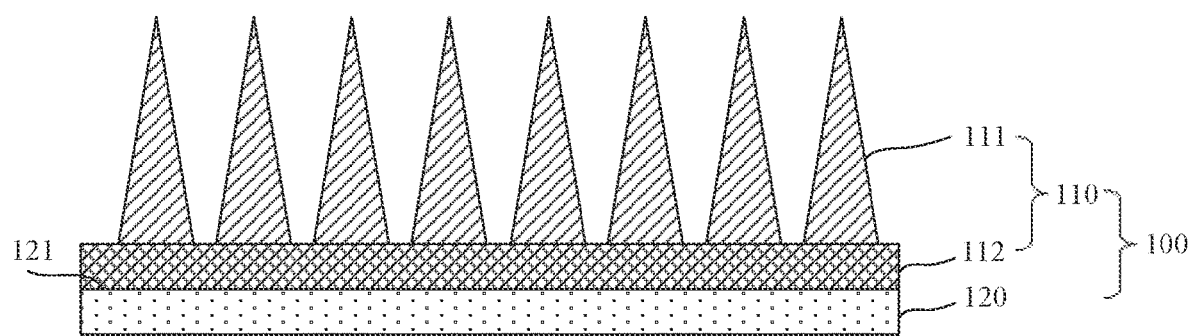
FIG. 7 is a schematic structural diagram of a first optical element including the antireflection film shown in FIG. 3 according to an embodiment of this application.
Figure 8:
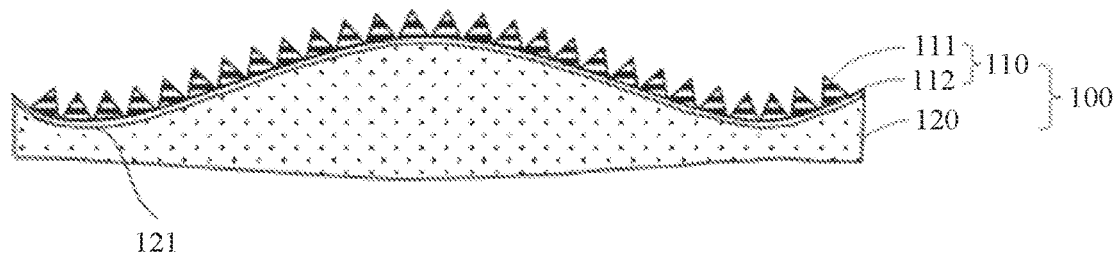
FIG. 8 is a schematic structural diagram of a second optical element including the antireflection film shown in FIG. 3 according to an embodiment of this application.

FIG. 3 and FIG. 7 are schematic structural diagrams of a first optical element including the antireflection film 110. The light transmission surface 121 of the optical waveguide 120 included in the optical element 100 is a flat light transmission surface 121. FIG. 5 and FIG. 8 are schematic structural diagrams of a second optical element including the antireflection film 110. The light transmission surface 121 of the optical waveguide 120 included in the optical element 100 is a curved light transmission surface 121.

For ease of description, as shown in FIG. 2, in this embodiment of this application, a surface that is of the convex structure 111 and that is close to the light transmission surface 121 is defined as a bottom surface of the convex structure, a surface that is of the convex structure 111 and that is away from the light transmission surface 121 is defined as a top surface of the convex structure, and a distance between geometric centers of surfaces of two adjacent convex structures 111 close to the light transmission surface 121 is defined as a distribution cycle of the convex structures. A thickness of the antireflection film 110 is denoted as T shown in FIG. 2. A maximum radial length of the bottom surface of the convex structure is denoted as $D_1$ shown in FIG. 2. A maximum radial length of the top surface of the convex structure is denoted as $D_2$ shown in FIG. 2. A height of the convex structure is denoted as $H_1$ shown in FIG. 2. A height of an adhesive layer is denoted as $H_0$ shown in FIG. 2. The distribution cycle of the convex structures is denoted as W shown in FIG. 2.

As shown in FIG. 2 or FIG. 6, the maximum radial length $D_1$ of the bottom surface of each convex structure is less than a minimum value of a visible light wavelength, the maximum radial length of each convex structure gradually decreases in a direction away from the light transmission surface 121, the height $H_1$ of each convex structure is greater than or equal to 310 nm, and the distribution cycle W of the convex structures is less than or equal to 220 nm. It can be learned that each convex structure 111 included in the antireflection film 110 gradually tapers from bottom to top, and the maximum radial length of each convex structure 111 and space between two adjacent convex structures 111 are both less than the minimum value of the visible light wavelength. It can be learned from the foregoing that the antireflection film 110 provided in this embodiment of this application has a nano moth-eye structure when the maximum radial length of each convex structure 111 and the space between the two adjacent convex structures 111 are both less than the minimum value of the visible light wavelength and each convex structure 111 included in the antireflection film 110 gradually tapers from bottom to top. Identification of each convex structure 111 included in the antireflection film 110 with the nano moth-eye structure and the space between the two adjacent convex structures 111 is not implemented for the visible light, so that the antireflection film 110 is considered as a thin homogeneous film.

Figure 4:
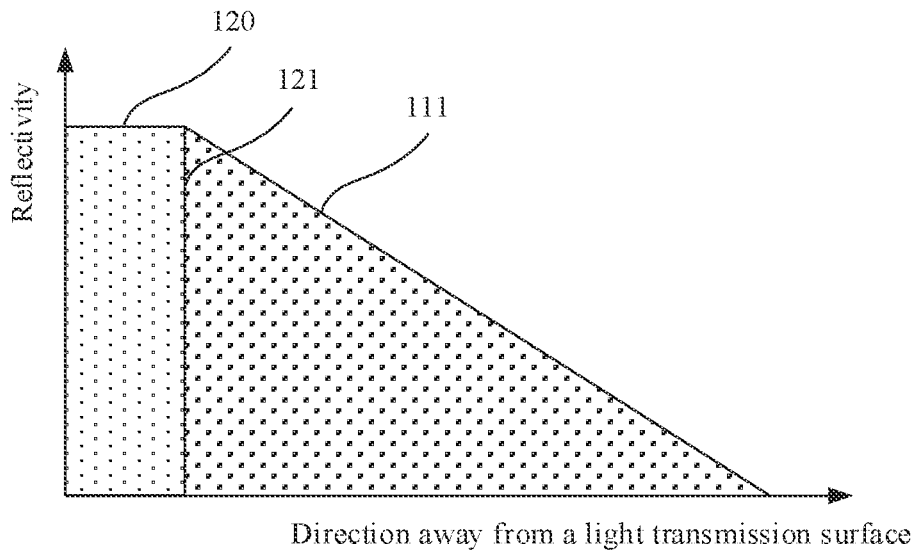
FIG. 4 is a change trend diagram of a refractive index of a convex structure for visible light in a direction away from a light transmission surface according to an embodiment of this application.

FIG. 4 is a change trend diagram of a refractive index of the convex structure 111 in the direction away from the light transmission surface 121 according to an embodiment of this application. An arrow direction of a horizontal coordinate in FIG. 4 represents the direction away from the light transmission surface 121. A vertical coordinate is the refractive index of the convex structure 111. It can be learned from FIG. 4 that, when the maximum radial length of each convex structure 111 gradually decreases in the direction away from the light transmission surface 121, the refractive index of the convex structure 111 gradually decreases in the direction away from the light transmission surface 121. Therefore, the antireflection reducing film 110 may be considered as a thin homogeneous film whose refractive index gradually increases in a direction close to the light transmission surface 121.

When the light transmission surface 121 used as an optical waveguide in-light surface is formed in the optical waveguide 120, a process in which the reflectivity of the optical element 100 for oblique incident light is reduced by using the antireflection film 110 provided in this embodiment of this application is as follows: When visible light is radiated in an oblique incidence manner to the optical waveguide 120 on which the antireflection film 110 is formed, the identification on each convex structure 111 included in the antireflection film 110 and the space between the two adjacent convex structures 111 is not implemented for the visible light. In addition, the refractive index of the antireflection film 110 for the visible light gradually increases in the direction close to the light transmission surface 121 used as the optical waveguide in-light surface, until the visible light enters the optical waveguide, to avoid a problem that the reflectivity of the optical waveguide increases due to a sudden refractive index change.

When the light transmission surface 121 used as an optical waveguide in-light surface is formed in the optical waveguide 120, a process in which the reflectivity of the optical element 100 for oblique incident light is reduced by using the antireflection film 110 provided in this embodiment of this application is as follows: When visible light is radiated from the optical waveguide in-light surface to the antireflection film 110, the refractive index of the antireflection film 110 for the visible light gradually decreases from a maximum value to a minimum value in the direction away from the light transmission surface 121 used as the optical waveguide in-light surface, until the visible light is transmitted out of the antireflection film 110, to avoid a problem that the reflectivity of the optical waveguide 120 increases due to a sudden refractive index change.

It can be learned from the foregoing that the antireflection film 110 shown in FIG. 2 or FIG. 6 formed on the light transmission surface 121 of the optical waveguide 120 shown in FIG. 3, FIG. 5, FIG. 7, or FIG. 8 may become a part of the optical element 100 shown in FIG. 3, FIG. 5, FIG. 7, or FIG. 8, or certainly may become a part of the optical element shown in FIG. 15 to FIG. 18 according to an actual requirement. In this case, the maximum radial length of each convex structure 111 gradually decreases in the direction away from the light transmission surface 121. The refractive index of each convex structure 111 gradually changes in the direction away from the light transmission surface 121, to avoid a problem that the reflectivity of the optical element 100 increases due to sudden changes of the refractive index of the convex structure 111 and a refractive index of the optical waveguide 120. However, because the distribution cycle W of the convex structures and the maximum radial length DA of the bottom surface of each convex structure are both less than the minimum value of the visible light wavelength, the identification on each convex structure 111 and the space between the two adjacent convex structures 111 is not implemented for the visible light radiated to the antireflection film 110, and therefore, the reflectivity of the optical element 100 for the visible light can be reduced by using the antireflection film 110. In addition, when the height $H_1$ of each convex structure is greater than or equal to 310 nm, and the distribution cycle W of the convex structures is less than or equal to 220 nm, without limitation of a shape of the optical element 100, the antireflection film 110 can be used to adjust and control the reflectivity of the optical element 100 for the visible light regardless of whether the visible light is radiated to the optical element 100 in a normal incidence manner or an oblique incidence manner, so that the optical element 100 has the extremely low reflectivity for the visible light.

It should be understood that the antireflection film 110 shown in FIG. 2 or FIG. 6 has a relatively simple structure. The antireflection film 110 may have the extremely low reflectivity for the visible light through controlling only parameters included in the antireflection film 110 instead of making structural improvement on each convex structure 111. In addition, the antireflection film 110 needs to include only the plurality of convex structures 111 instead of using a multi-layer antireflection structure. Therefore, the antireflection film 110 is relatively simple in structure and simple in processing, and also is relatively light and thin, which facilitates lightening and thinning of the optical element.

In some possible implementations, as shown in FIG. 2, to reduce difficulty in manufacturing the convex structure 111, the height $H_1$ of each convex structure shown in FIG. 2 is further less than or equal to 450 nm, and the distribution cycle W of the convex structures is greater than or equal to 160 nm, to facilitate manufacturing of the convex structure 111 when it is ensured that the refractive index of each convex structure 111 slowly changes in the direction away from the light transmission surface.

In some possible implementations, as shown in FIG. 2 or FIG. 6, the maximum radial length $D_2$ of the top surface of each convex structure is 0 times to 0.3 times the maximum radial length $D_1$ of the bottom surface of the corresponding convex structure.

As shown in FIG. 6, when the maximum radial length $D_2$ of the top surface of each convex structure is 0 times the maximum radial length $D_1$ of the bottom surface of the corresponding convex structure, and an area of the top surface of each convex structure is 0, in this case, each convex structure 111 is essentially a needle-like convex structure that gradually becomes thick in the direction away from the light transmission surface 121. The needle-like convex structure is the convex structure 111 included in the antireflection film 110 shown in FIG. 6. The antireflection film 110 shown in FIG. 6 may be formed on a flat light transmission surface, or may be formed on a curved light transmission surface. FIG. 7 is a schematic structural diagram of a first optical element including the antireflection film 110 shown in FIG. 6. The light transmission surface 121 of the optical waveguide included in the optical element 100 is a flat light transmission surface. FIG. 8 is a schematic structural diagram of a second optical element including the antireflection film 110 shown in FIG. 7. The light transmission surface 121 of the optical waveguide included in the optical element 100 is a curved light transmission surface.

When the needle-like convex structure is the convex structure 111 included in the antireflection film 110 shown in FIG. 6, the refractive index of each convex structure 111 for the visible light gradually decreases in the direction away from the light transmission surface 121, until the refractive index of each convex structure 111 is equal to an air refractive index. In other words, an equivalent refractive index of the antireflection film 110 gradually decreases in the direction away from the light transmission surface 121, until the equivalent refractive index of the antireflection film 110 is equal to the air refractive index. In this way, when the visible light can be radiated from the air to the optical element 100, the antireflection film 110 can enable the visible light to be refracted gradually in a more natural manner, to better adjust and control the reflectivity of the optical element 100, so that the optical element 100 has the extremely low reflectivity.

It should be noted that, as shown in FIG. 6, when the maximum radial length $D_2$ of the top surface of each convex structure is 0 times the maximum radial length $D_1$ of the bottom surface of the corresponding convex structure, the area of the top surface of each convex structure is 0, and a profile of each convex structure 111 is a tapered profile. For example, when the profile of each convex structure 111 is the tapered profile, each convex structure 111 is a tapered convex structure, for example, a tapered convex structure such as a cone convex structure or a pyramid convex structure. The pyramid convex structure may be a regular triangular pyramid convex structure, a quadrangular pyramid convex structure, or a hexagonal pyramid convex structure. Alternatively, the pyramid convex structure may be an irregular pyramid structure. This is not listed herein.

As shown in FIG. 2, when a ratio of the maximum radial length $D_2$ of the top surface of each convex structure to the maximum radial length $D_1$ of the bottom surface of the corresponding convex structure is greater than 0 and less than or equal to 0.3, in this case, as shown in FIG. 2, the area of the surface that is of each convex structure 111 and that is away from the light transmission surface 121 is greater than 0, so that the antireflection film 110 can be used to adjust and control the reflectivity of the optical element 100 shown in FIG. 3 or FIG. 5. In addition, when each convex structure 111 is manufactured, the area of the top surface of each convex structure does not need to be limited to 0, to reduce manufacturing precision of each convex structure 111 and further reduce difficulty in manufacturing the antireflection film 110. In addition, because the maximum radial length of each convex structure 111 gradually decreases in the direction away from the light transmission surface 121, a larger ratio of the maximum radial length $D_1$ of the bottom surface of each convex structure to the maximum radial length $D_1$ of the top surface of the corresponding convex structure indicates the greater height $H_1$ of each convex structure. The higher convex structure 111 indicates higher manufacturing difficulty. On this basis, the ratio of the maximum radial length $D_2$ of the top surface of each convex structure to the maximum radial length $D_1$ of the bottom surface of the corresponding convex structure is controlled to control the height $H_1$ of each convex structure in a proper range. In this way, the refractive index of each convex structure 111 gradually decreases in the direction away from the light transmission surface 121, to further reduce the difficulty in manufacturing each convex structure 111 when it is ensured that the refractive index of the convex structure 111 decreases.

It should be noted that, as shown in FIG. 2, when the ratio of the maximum radial length $D_2$ of the top surface of each convex structure to the maximum radial length $D_1$ of the bottom surface of the corresponding convex structure is greater than 0 and less than or equal to 0.3, a profile of each convex structure 1 may be a Gaussian profile or a parabolic profile. Certainly, to reduce manufacturing difficulty, when the convex structure 111 is actually manufactured, the manufactured convex structure 111 may also be a frustum convex structure similar to the tapered convex structure. The frustum convex structure is the convex structure included in the antireflection film 110 shown in FIG. 2.

In some possible implementations, a ratio of the height $H_1$ of each convex structure shown in FIG. 2 or FIG. 6 to the maximum radial length $D_1$ of the bottom surface of the corresponding convex structure is greater than or equal to 1 to 3, to optimize a rate at which the refractive index of each convex structure 111 decreases in the direction away from the light transmission surface 121 shown in FIG. 3 or FIG. 5. Therefore, when the visible light is radiated to the optical element 100, a problem that the reflectivity of the optical element 100 increases due to a change of the refractive index of the convex structure 111 can be further avoided, to ensure that the reflectivity of the optical element 100 is further reduced. For example, the height $H_1$ of the convex structure is equal to 310 nm, and the maximum radial length $D_1$ of the bottom surface of the corresponding convex structure is equal to 220 nm. In this case, the ratio of the height of the convex structure to the maximum radial length of the surface that is of the corresponding convex structure and that is close to the light transmission surface is 1.4.

In some possible implementations, to ensure that the plurality of convex structures 111 included in the antireflection film 110 shown in FIG. 2 can fully use the light transmission surface 121 shown in FIG. 3 or FIG. 5, a distribution manner of the plurality of convex structures 111 is an array distribution manner such as a dense stacking distribution manner. When the plurality of convex structures 111 uses the dense stacking distribution manner, the light transmission surface 121 included in the optical waveguide 120 may be fully used, so that the plurality of convex structures 111 are evenly formed on the light transmission surface 121 as many as possible. In this way, a homogeneous film layer can be equivalently formed for the antireflection film 110, to further reduce the reflectivity of the optical element 100. It should be understood that the plurality of convex structures 111 included in the antireflection film 110 shown in FIG. 6 may also use the array distribution manner such as the dense stacking distribution manner.

As shown in FIG. 2 or FIG. 6, when the distribution manner of the plurality of convex structures 111 is the array distribution manner such as the dense stacking distribution manner, the dense stacking distribution manner may be a quadrilateral dense stacking distribution manner, a hexagonal dense stacking distribution manner, or the like. This is not listed herein. The maximum radial length $D_1$ of the bottom surface of each convex surface is equal to the distribution cycle W of the convex structures. The distribution manner of the plurality of convex structures 111 is the dense stacking distribution manner, to fully use the light transmission surface 121 included in the optical waveguide 120, so that the plurality of convex structures 111 are evenly formed on the light transmission surface 121 as many as possible. In this way, a homogeneous film layer can be equivalently formed for the antireflection film 110, to further reduce the reflectivity of the optical element 100. For example, when the bottom surface of each convex structure 111 is a circle, the maximum radial length $D_1$ of the bottom surface of each convex structure 111 is a diameter of the bottom surface of the corresponding convex structure 111. In this case, a distance between centers of circles of bottom surfaces of two adjacent convex structures 111 is equal to the diameter of the bottom surface. Therefore, the plurality of convex structures 111 use the dense stacking distribution manner on the light transmission surface 121, to fully use a region of the light transmission surface 121.

When the distribution cycle W of the convex structures shown in FIG. 2 or FIG. 6 is 160 nm to 200 nm, the distance between the two adjacent convex structures 111 may be further reduced, so that the convex structures 111 are distributed on the light transmission surface 121 as many as possible. In addition, a probability that identification on the convex structure 111 is implemented for the visible light can be further reduced, to better reduce the reflectivity of the optical element 100 for the visible light by using the antireflection film 110. It should be understood that, to ensure that the convex structures 111 can be evenly distributed on the light transmission surface, the distribution cycle W of the convex structures should be maintained consistent as much as possible.

For example, a shape of the bottom surface of each convex structure 111 is a circle, and the diameter of the bottom surface of the convex structure 111 is 50 nm to 250 nm. When the plurality of convex structures 111 use the dense stacking distribution manner, the distance between the centers of circles of the two adjacent convex structures 111 is 160 nm to 200 nm, and the diameter of the bottom surface of each convex structure 111 is 160 nm to 200 nm.

In some possible implementations, as shown in FIG. 2 or FIG. 6, to improve adhesion between the light transmission surface 121 and the convex structures 111, the antireflection film 110 further includes the adhesive layer 112. The adhesive layer 112 is located on the bottom surfaces of the plurality of convex structures 111. When the antireflection film 110 is formed on the optical waveguide 120, the adhesive layer 112 is first formed on the light transmission surface 121, and then the plurality of convex structures 111 are formed on a surface that is of the adhesive layer 112 and that is away from the light transmission surface 121 shown in FIG. 3. FIG. 5, FIG. 7, or FIG. 8. In this way, the adhesive layer 112 can be used to improve adhesion between the light transmission surface 121 and the plurality of convex structures 111, and the adhesive layer 112 can be further used to buffer pressure or even damage to the light transmission surface 121 when the plurality of convex structures 111 are manufactured by using a manufacturing process such as an embossing technique. In this way, the adhesive layer 112 has a protection function for the light transmission surface 121. Therefore, the following case can be avoided: The light transmission surface 121 is damaged due to problems such as a process error when the plurality of convex structures 111 are directly manufactured on the light transmission surface 121 by using the manufacturing process such as the embossing technique.

As shown in FIG. 2 or FIG. 6, the height $H_0$ of the adhesive layer (a direction of the height $H_0$ of the adhesive layer is consistent with a direction of the height $H_1$ of the convex structure) should be ensured as much as possible to be greater than 0 nm and less than 10 nm. In this way, an effect of the adhesive layer 112 to a light transmittance is minimized, and the adhesive layer 112 formed on the light transmission surface 121 has good flatness with no obvious wrinkles, so that the adhesive layer 112 and the light transmission surface 121 are tightly fitted to each other.

As shown in FIG. 2, when the antireflection film 110 has no adhesive layer 112, the thickness T of the antireflection film (a direction of the thickness T of the antireflection film is consistent with a direction of the height $H_0$ of the adhesive layer) is 310 nm to 450 nm, that is, the thickness of the antireflection film is essentially the height $H_1$ of the convex structure. When the antireflection film 110 includes the adhesive layer 112 whose height is less than 10 nm, the thickness T of the antireflection film is greater than 320 nm and less than 460 nm, to reduce a loss rate of light passing through the adhesive layer 112 and ensure that the convex structures 111 can be stably formed on the light transmission surface 121.

To reduce a loss when the visible light passes through the antireflection film 110, as shown in FIG. 2, a total light transmittance of the adhesive layer 112 and/or a total light transmittance of each convex structure 111 are/is greater than 90%.

To avoid a problem that the reflectivity of the optical element 100 increases due to a sudden refractive index change, as shown in FIG. 2, a difference between a refractive index of a material included in the adhesive layer 112 and a refractive index of a material included in each convex structure 111 is −0.2 to 0.2, to ensure that a refractive index of the adhesive layer 112 is relatively close to a refractive index of the convex structure 111, thereby avoiding a problem that the reflectivity of the optical element 100 for light increases due to the refractive index change.

The material included in the adhesive layer 112 and the material included in the convex structure 111 may be selected according to an actual requirement. For example, the material included in the adhesive layer 112 is a silane material such as a modified silane adhesive. For example, the modified silane adhesive may be various silane terminated polyether adhesives. The material included in the convex structure 111 may be selected based on the refractive index of the material included in the adhesive layer 112.

In some possible implementations, as shown in FIG. 3, FIG. 5, FIG. 7, or FIG. 8, the plurality of convex structures 111 are formed on the light transmission surface 121 by using the embossing technique, so that manufacturing of the plurality of convex structures 111 can be completed at a time, thereby improving a speed of manufacturing the antireflection film 110.

When the plurality of convex structures 111 are formed on the light transmission surface 121 by using the embossing technique, the convex structure 111 is a convex structure formed through curing of a photocurable adhesive or curing of a thermocurable adhesive. For example, when the convex structure 111 is the convex structure formed through the curing of the photocurable adhesive, in a process of embossing the photocurable adhesive by using a transparent mold, embossing of the convex structure 111 may be completed through light radiation. In this case, the embossing technique and the photocuring process are continuously performed, to continuously manufacture the convex structures 111. When the convex structure 111 is the convex structure 111 formed through the curing of the thermocurable adhesive, in a process of embossing the photocurable adhesive by using a mold, the convex structure 111 in the embossing is heated, so that the convex structure 111 is quickly cured. It should be understood that, when the adhesive layer 112 exists, to ensure that the material included in the adhesive layer 112 is close as much as possible to the material included in the plurality of convex structures 111, the material included in the adhesive layer 112 should be considered when the photocurable adhesive or the thermocurable adhesive is selected. For example, the difference between the refractive index of the material included in the adhesive layer 112 and the refractive index of the material included in each convex structure 111 is −0.2 to 0.2, the material included in the adhesive layer 112 is the silane material, and the material selected for each convex structure 111 is an ultraviolet photocurable adhesive. In this case, a refractive index of the silane material and a refractive index of the ultraviolet photocurable adhesive need to be both considered, so that the difference between the refractive indexes meets a requirement of −0.2 to 0.2.

To further prove that the antireflection film provided in this embodiment of this application can be used to effectively reduce the reflectivity of the optical element for normal incident light and oblique incident light, structure parameters of the antireflection film are set, and a reflectivity curve of glass with the antireflection film 110 formed on an incident surface at an incident angle of 0° (normal incidence) and 40° (oblique incidence) is simulated. The plurality of convex structures 111 included in the antireflection film are distributed on an in-light surface of the glass in a hexagonal dense stacking distribution manner. Each convex structure 111 is a hexagonal pyramid. When the incident angle is set to 0°, maximum reflectivity $R_{max}$ of the glass is less than or equal to 0.5%, to meet relatively low reflectivity of the glass in normal incidence. When the incident angle is equal to 40°, maximum reflectivity $R_{max}$ of the glass is less than or equal to 1%, to meet relatively low reflectivity of the glass in oblique incidence.

Table 1 shows a structure parameter list of a first group of antireflection films. The first group of antireflection films listed in Table 1 have the same structure parameter except the height $H_1$ of the convex structure. Curve labels in Table 1 indicate the reflectivity curve labels of the glass on which the first group of antireflection films are formed in FIG. 9 and FIG. 10.

TABLE 1

Structure parameter list of a first group of antireflection films (unit: nm)

| Curve label | Structure parameter | | | | |
|---|---|---|---|---|---|
| | $D_1$ | $D_2$ | $H_1$ | $H_0$ | W |
| A | 180 | 0 | 300 | 0 | 180 |
| B | 180 | 0 | 310 | 0 | 180 |
| C | 180 | 0 | 320 | 0 | 180 |
| D | 180 | 0 | 330 | 0 | 180 |
| E | 180 | 0 | 340 | 0 | 180 |
| F | 180 | 0 | 350 | 0 | 180 |
| G | 180 | 0 | 360 | 0 | 180 |
| H | 180 | 0 | 370 | 0 | 180 |
| I | 180 | 0 | 380 | 0 | 180 |
| G | 180 | 0 | 390 | 0 | 180 |
| K | 180 | 0 | 400 | 0 | 180 |
| L | 180 | 0 | 410 | 0 | 180 |
| M | 180 | 0 | 420 | 0 | 180 |
| N | 180 | 0 | 430 | 0 | 180 |
| O | 180 | 0 | 440 | 0 | 180 |
| P | 180 | 0 | 450 | 0 | 180 |

Figure 9:
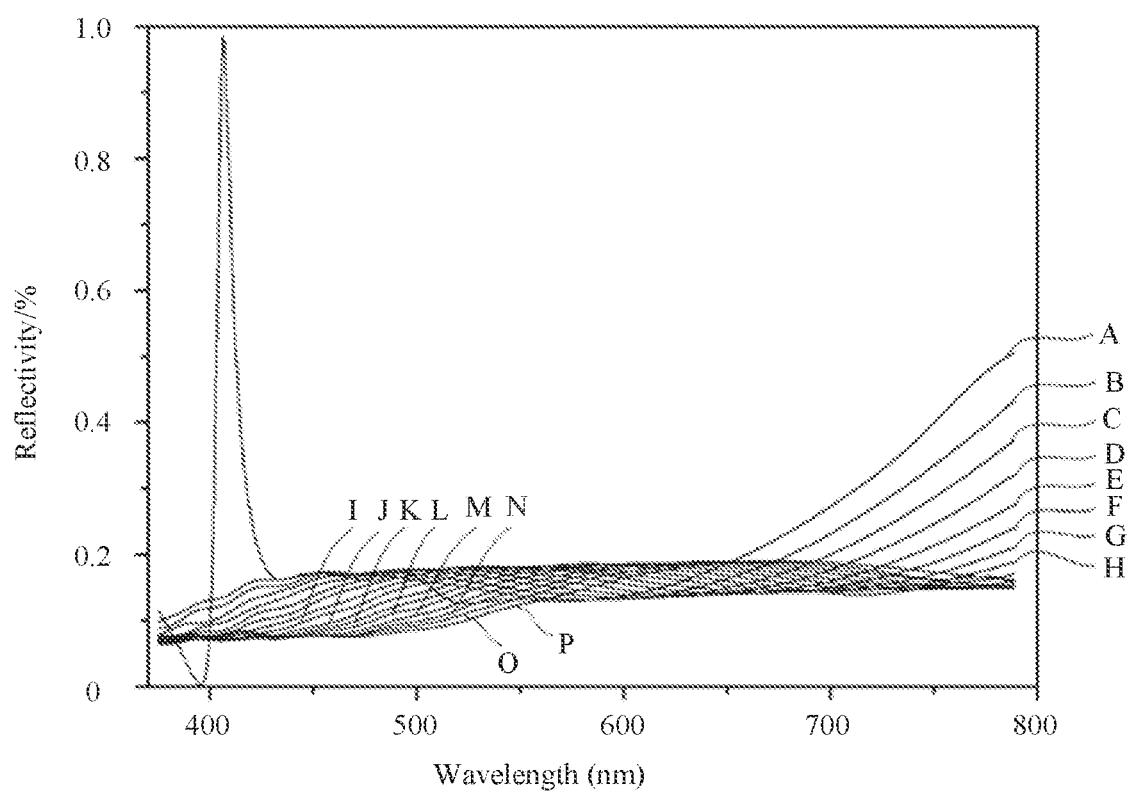
FIG. 9 is reflectivity curves of glass on which a first group of antireflection films are formed when an incident angle is equal to 0° according to an embodiment of this application.

FIG. 9 is reflectivity curves of glass on which the first group of antireflection films are formed when an incident angle is equal to 0°. It may be found from FIG. 9 that, when the incident angle is equal to 0° and the height $H_1$ of the convex structure included in the first group of antireflection films is equal to 300 nm, maximum reflectivity of the antireflection film for visible light whose wavelength is about 420 nm is extremely large and is almost equal to 1%. When the height of the convex structure included in the first group of the antireflection films is greater than or equal to 310 nm, maximum reflectivity of the antireflection film for visible light with different wavelengths is all less than or equal to 0.5%.

Figure 10:
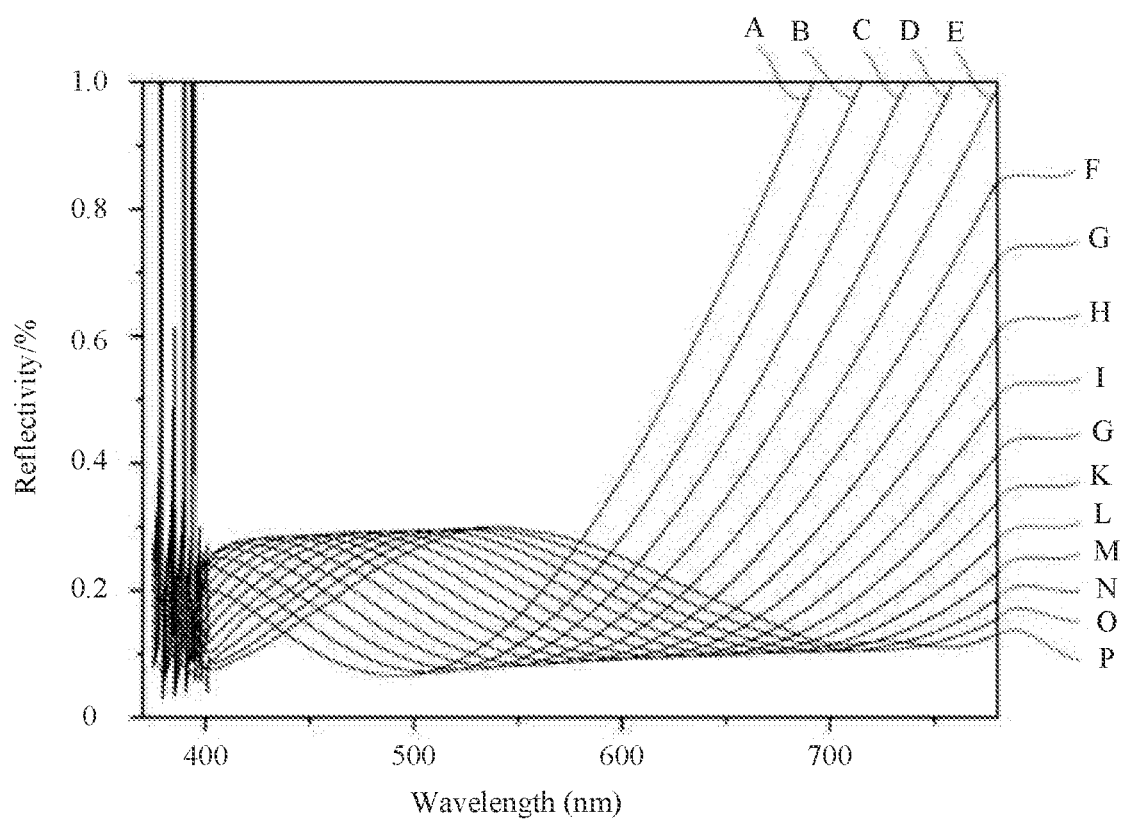
FIG. 10 is reflectivity curves of glass on which a first group of antireflection films are formed when an incident angle is equal to 400 according to an embodiment of this application.

FIG. 10 is reflectivity curves of glass on which the first group of antireflection films are formed when an incident angle is equal to 40°. It may be found from FIG. 10 that, when the incident angle is equal to 40° and the height $H_1$ of the convex structure included in the first group of antireflection films is equal to 300 nm, maximum reflectivity of the antireflection film for visible light whose wavelength is within 700 nm is greater than 1%. When the height of the convex structure included in the first group of antireflection films is greater than or equal to 310 nm, maximum reflectivity of the antireflection film for visible light within 700 nm is less than or equal to 0.5%.

It can be learned from the foregoing that, when the height $H_1$ of each convex structure included in the first group of antireflection films is greater than or equal to 310 nm, the maximum reflectivity $R_{max}$ of the glass for visible light with different wavelengths is less than or equal to 0.5% in a normal incidence case when the incident angle is equal to 0°, and the maximum reflectivity $R_{max}$ of the glass for visible light with different wavelengths is less than or equal to 1% in a normal incidence case when the incident angle is equal to 40°. In addition, to reduce difficulty in manufacturing the convex structure 111, the maximum height of the convex structure 111 is set to 450 nm. In other words, when the height of each convex structure is 310 nm to 450 nm, the convex structure 111 can be easily manufactured. In addition, it can ensured in two incidence manners: a normal incidence manner and an oblique incidence manner that the glass on which the antireflection film 110 is formed has relatively low reflectivity for the visible light and even lower reflectivity for visible light whose wavelength is within 420 nm to 700 nm.

Table 2 shows a structure parameter list of a second group of antireflection films. The second group of antireflection films listed in Table 2 have the same structure parameters except the distribution cycle W and the maximum radial length Ai of the bottom surface of the convex structure.

TABLE 2

Structure parameter list of a second group of antireflection films (unit: nm)

| Serial Number | Structure Parameter | | | | |
|---|---|---|---|---|---|
| | $D_1$ | $D_2$ | $H_1$ | $H_0$ | W |
| 1 | 160 | 0 | 375 | 0 | 160 |
| 2 | 170 | 0 | 375 | 0 | 170 |
| 3 | 180 | 0 | 375 | 0 | 180 |
| 4 | 190 | 0 | 375 | 0 | 190 |
| 5 | 200 | 0 | 375 | 0 | 200 |
| 6 | 210 | 0 | 375 | 0 | 210 |
| 7 | 220 | 0 | 375 | 0 | 220 |
| 8 | 230 | 0 | 375 | 0 | 230 |
| 9 | 240 | 0 | 375 | 0 | 240 |

Figure 11:
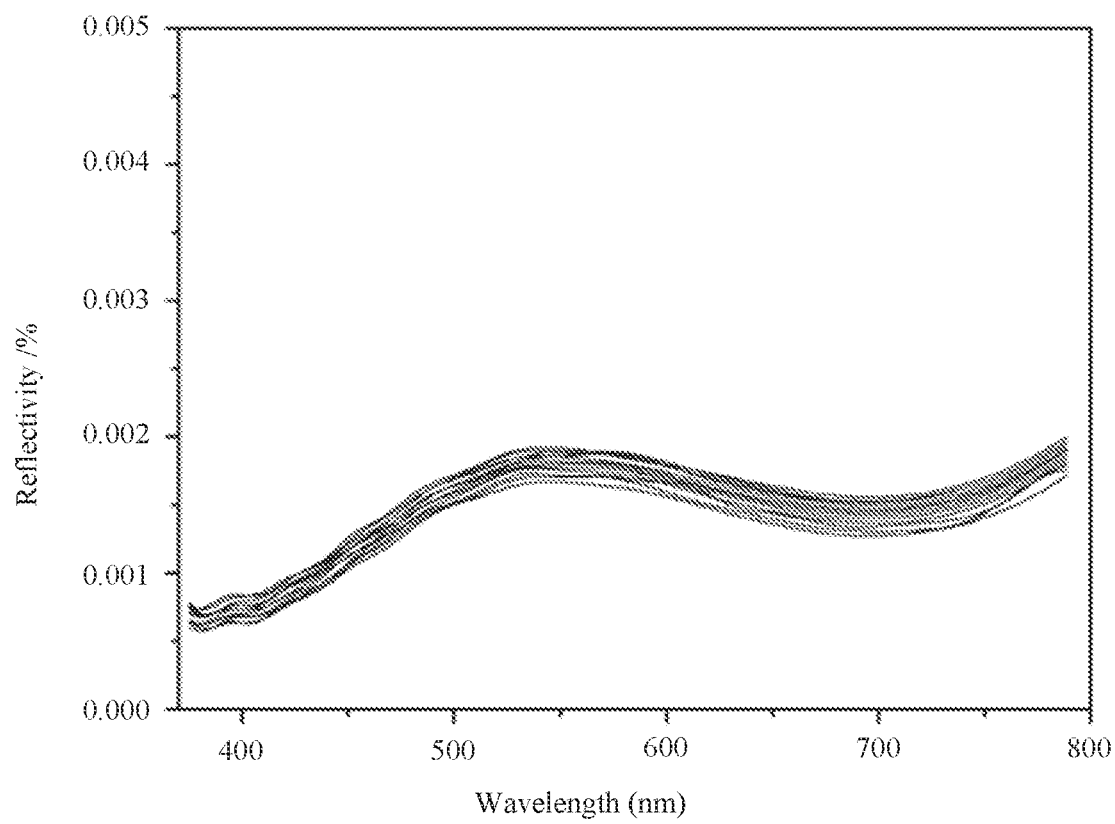
FIG. 11 is reflectivity curves of glass on which a second group of antireflection films are formed when an incident angle is equal to 0° according to an embodiment of this application.

FIG. 11 is reflectivity, curves of glass on which the second group of antireflection films are formed when an incident angle is equal to 0°. It may be found from FIG. 11 that, in a normal incidence case when the incident angle is equal to 0°, the reflectivity of the glass for the visible light with different wavelengths changes slightly, and the maximum reflectivity of the glass for the visible light with different wavelengths is all less than 0.5%.

Figure 12:
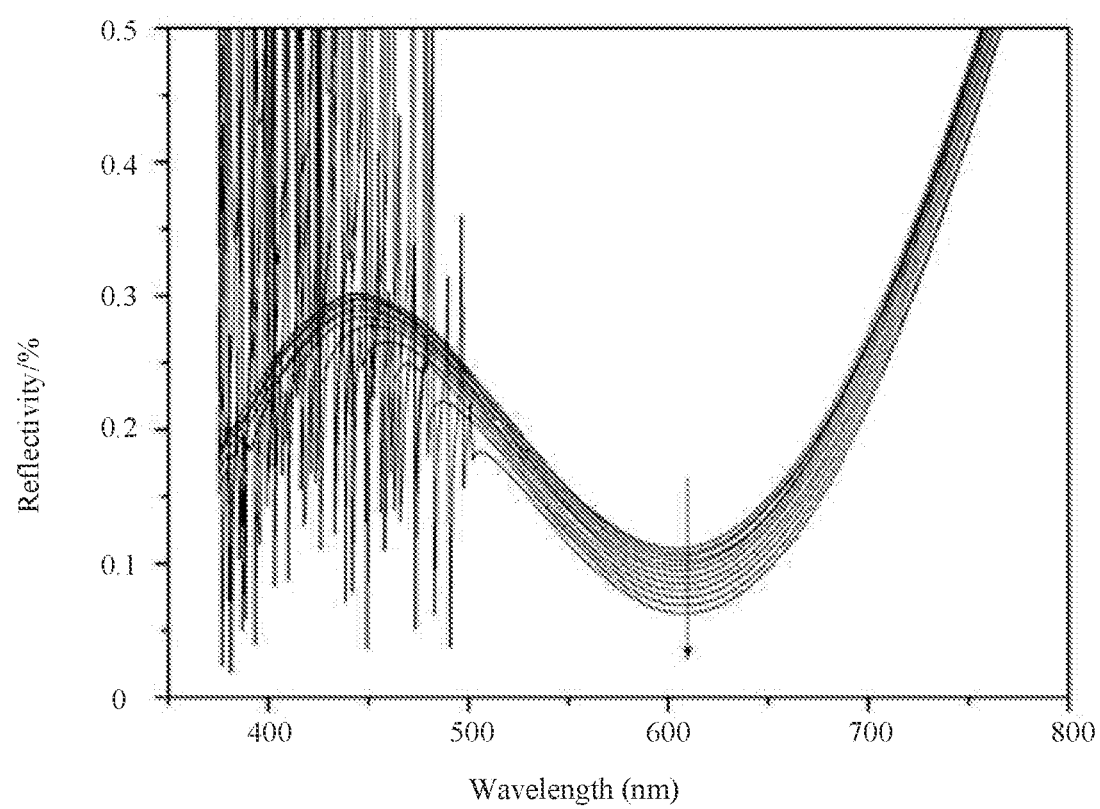
FIG. 12 is reflectivity curves of glass on which a second group of antireflection films are formed when an incident angle is equal to 40° according to an embodiment of this application.

FIG. 12 is reflectivity curves of glass on which the second group of antireflection films are formed when an incident angle is equal to 40°. A direction of an arrow in FIG. 12 represents an arrangement sequence of reflectivity curves of the glass on which the second group of antireflection films are formed when the incident angle is equal to 40° and a distribution cycle W of convex structures included in the second group of antireflection films gradually increases in the direction indicated by the arrow. It may be found from FIG. 12 that, in an oblique incidence case when the incident angle is equal to 40°, with increase of the distribution cycle of the convex structures, a resonant peak appears in a blue light band when the distribution cycle of the convex structures is greater than 220 nm, and the following requirement cannot be met. The maximum reflectivity $R_{max}$ of the glass for the visible light with different wavelengths is less than or equal to 0.5% in a normal incidence case when an incident angle is equal to 0°, and the maximum reflectivity $R_{max}$ of the glass for the visible light with different wavelengths is less than or equal to 1% in a normal incidence case when an incident angle is equal to 40°. Therefore, the distribution cycle W of the convex structures included in the antireflection film 110 should be less than or equal to 220 nm. In addition, the smaller distribution cycle W of the convex structures indicates higher difficulty in manufacturing the convex structure. Therefore, a minimum value of the distribution cycle W of the convex structures is set to 160 nm.

It may be learned that the distribution cycle W of the convex structures included in the antireflection film provided in this embodiment of this application is 160 nm to 220 nm. In this case, the convex structure can be easily manufactured. In addition, it can be further ensured in two incidence manners: a normal incidence manner and an oblique incidence manner that the glass on which the antireflection film is formed has relatively low reflectivity for visible light and even lower reflectivity especially for visible light between 420 nm and 700 nm.

An embodiment of this application further provides an optical element 100. As shown in FIG. 3 or FIG. 7, the optical element 100 includes the optical waveguide 120 and the antireflection film 110. The antireflection film 110 is located on the at least one light transmission surface 121 included in the optical waveguide 120, so that the plurality of convex structures 111 are located on the light transmission surface 121. The plurality of convex structures 111 may be formed on the light transmission surface 121 in an embossing manner or the like. If a material with fluidity is selected for the convex structure 111, after embossing is completed, curing processing needs to be performed based on a physicochemical characteristic of the material, to form the plurality of convex structures 111 on the light transmission surface 121. It should be understood that the light transmission surface 121 may be a flat light transmission surface shown in FIG. 3 or FIG. 7, or may be a curved light transmission surface shown in FIG. 5 or FIG. 8.

The optical element 100 provided in this embodiment of this application includes not only the optical waveguide 120, but also the antireflection film 110 described above. The antireflection film 110 includes the plurality of convex structures 111 formed on the at least one light transmission surface 121 included in the optical waveguide 120. A maximum radial length of each convex structure 111 gradually decreases in a direction away from the light transmission surface 121. A refractive index of each convex structure 111 gradually changes in the direction away from the light transmission surface 121, to avoid a problem that reflectivity of the optical element 100 increases due to sudden changes of a refractive index of the convex structure 111 and a refractive index of the optical waveguide 120. In addition, because a distribution cycle W of the convex structures 111 and a maximum radial length $D_1$ of a bottom surface of each convex structure are both less than a minimum value of a visible light wavelength, identification on each convex structure 111 and space between two adjacent convex structures 111 is not implemented for the visible light radiated to the antireflection film 110, and therefore, reflectivity of the optical element 100 for the visible light can be reduced by using the antireflection film 110. It is found through analysis that, when a height $H_1$ of each convex structure is greater than or equal to 310 nm, and the distribution cycle W of the convex structures is less than or equal to 220 nm, without limitation of a shape of the optical element 100, the antireflection film 110 can be used to adjust and control the reflectivity of the optical element 100 for the visible light regardless of whether the visible light is radiated to the optical element 100 in a normal incidence manner or an oblique incidence manner, so that the optical element 100 has the extremely low reflectivity for the visible light.

In a possible implementation, as shown in FIG. 5 or FIG. 8, when the antireflection film 110 included in the optical element 100 is the antireflection film shown in FIG. 2, the maximum reflectivity of the optical element 100 is less than or equal to 0.5% when an incident angle is equal to 0°, and the maximum reflectivity of the optical element 100 is less than or equal to 1% when the incident angle is less than or equal to 40°. In this way, when the optical element 100 is applied to a camera module, a ghost problem and a flare problem do not occur in a picture taken by the camera module when a light incidence angle is less than or equal to 40°.

In a possible implementation, as shown in FIG. 5 or FIG. 8, a difference between a refractive index of a material included in each convex structure 111 and a refractive index of a material included in the optical waveguide 120 is −0.2 to 0.2, to ensure that the refractive index of the material included in each convex structure 111 is relatively close to the refractive index of the material included in the optical waveguide 120, thereby avoiding a problem that the reflectivity of the optical element 100 increases due to sudden changes of a refractive index of the convex structure 111 and a refractive index of the optical waveguide 120.

For example, as shown in FIG. 2 or FIG. 6, the plurality of convex structures 111 included in the antireflection film 110 are distributed on an in-light surface of glass in a hexagonal dense stacking distribution manner. Each convex structure 111 is a hexagonal pyramid. The distribution cycle W of the convex structures is equal to 180 nm, the maximum radial length $D_1$, of the bottom surface of each convex structure is 180 nm, the height $H_1$ of each convex structure is 375 nm, a height $H_0$ of the adhesive layer is equal to 0, a maximum radial length $D_2$ of a top surface of each convex structure is equal to 0 nm, and a refractive index no of the glass is equal to 1.5099.

Figure 13:
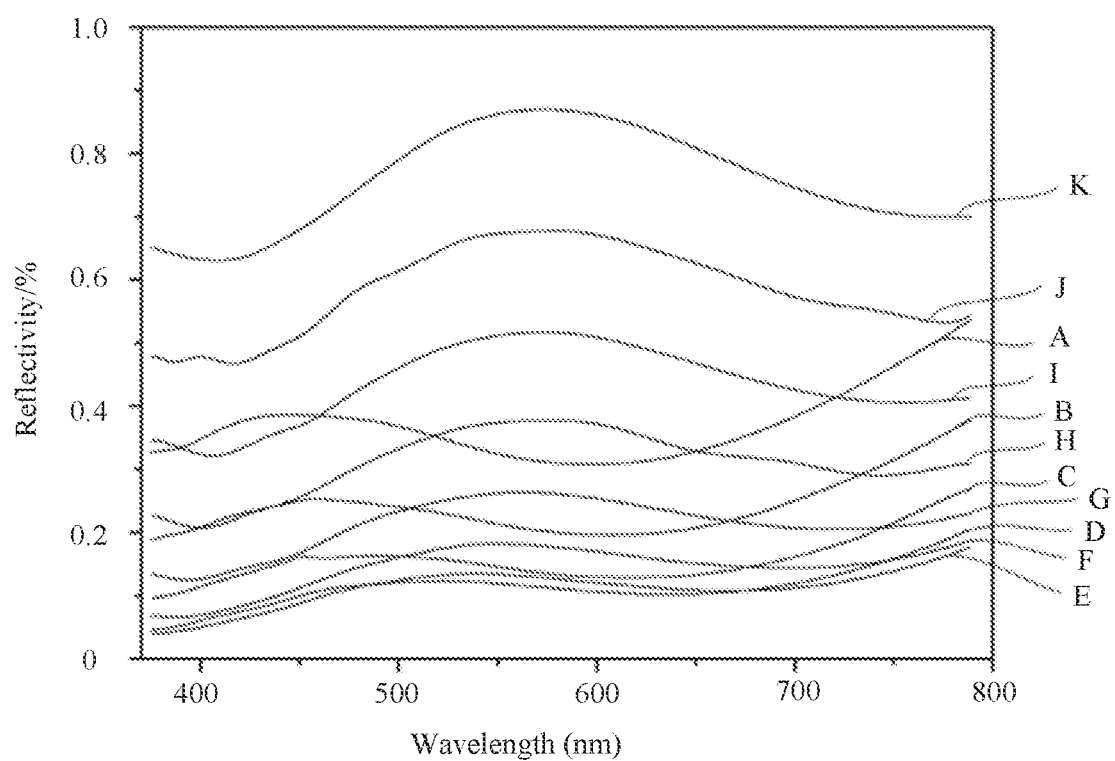
FIG. 13 is reflectivity curves of glass with different refractive indexes on which an antireflection film is formed when an incident angle is equal to 0° according to an embodiment of this application.
Figure 14:
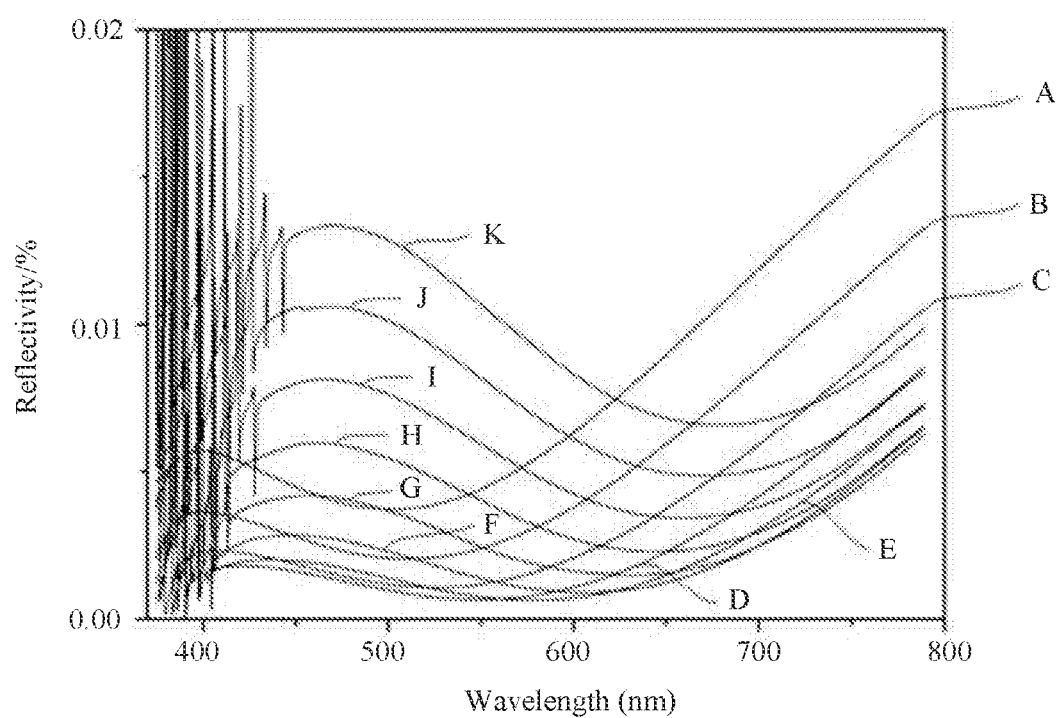
FIG. 14 is reflectivity curves of glass with different refractive indexes on which an antireflection film is formed when an incident angle is equal to 40° according to an embodiment of this application.

FIG. 13 is reflectivity curves of glass with different refractive indexes on which the antireflection film 110 is formed when an incident angle is equal to 0°. FIG. 14 is reflectivity curves of glass with different refractive indexes on which the antireflection film 110 is formed when an incident angle is equal to 40°. In FIG. 13 and FIG. 14, a glass refractive index corresponding to a curve A is 1.3099, a glass refractive index corresponding to a curve B is 1.3499, a glass refractive index corresponding to a curve C is 1.3899, a glass refractive index corresponding to a curve D is 1.4299, a glass refractive index corresponding to a curve E is 1.4699, a glass refractive index corresponding to a curve F is 1.5099, a glass refractive index corresponding to a curve G is 1.5499, a glass refractive index corresponding to a curve H is 1.5899, a glass refractive index corresponding to a curve I is 1.6299, a glass refractive index corresponding to a curve J is 1.6699, and a glass refractive index corresponding to a curve K is 1.7099.

It can be learned from FIG. 13 that, when an incident angle is equal to 40°, maximum refractive indexes of the glass with different refractive indexes on which the antireflection film 110 is formed all meet a requirement of less than or equal to 1%. It can be learned from FIG. 14 that, when the incident angle is equal to 40° and the refractive index of the antireflection film is greater than 1.5899, resonance occurs in a blue light (at a position of 400 nm) band, which affects glass surface reflectivity. Therefore, the refractive index of the antireflection film should be less than or equal to 1.5899. When the refractive index of the antireflection film is less than the refractive index of the glass, the reflectivity of the glass for visible light with different wavelengths increases when the incident angle is equal to 0°. When the refractive index of the antireflection film is less than 1.3099, a requirement that the maximum reflectivity $R_{max}$ of the glass for the visible light with different wavelengths is less than or equal to 0.5% when the incident angle is equal to 0° is not met. Therefore, the refractive index of the antireflection film should be greater than or equal to 1.3099.

It can be learned from the foregoing that when the refractive index of the antireflection film is 1.3099 to 1.5899, the glass on which the antireflection film is formed can meet a requirement of relatively low reflectivity for visible light in normal incidence and oblique incidence. For a specific requirement, refer to the foregoing content. In other words, when a difference between a refractive index of a material included in the antireflection film and a refractive index of a material included in the glass is −0.2 to 0.2, the glass on which the antireflection film is formed can meet the reflectivity requirement. In this case, it may be considered that, when the difference between the refractive index of the material included in the antireflection film and the material included in the optical waveguide is −0.2 to 0.2, the refractive index of the material included in the antireflection film is close to the refractive index of the material included in the optical waveguide, and the antireflection film does not adversely affect reflectivity of the optical waveguide. It should be understood that the difference between the refractive index of the material included in the antireflection film and the refractive index of the material included in the glass is −0.2 to 0.2, which is also applicable to a difference between a refractive index of a material included in the convex structure and a refractive index of a material included in the adhesive layer.

To improve a light transmittance and reduce a light loss, as shown in FIG. 3, FIG. 5, FIG. 7, and FIG. 8, a total light transmittance of the optical waveguide 120 and/or a total light transmittance of the antireflection film 110 are/is greater than 90%, to increase a light transmittance and avoid a light loss problem caused because light entering the optical waveguide 120 and/or the antireflection film 110 cannot be transmitted out.

Figure 29:
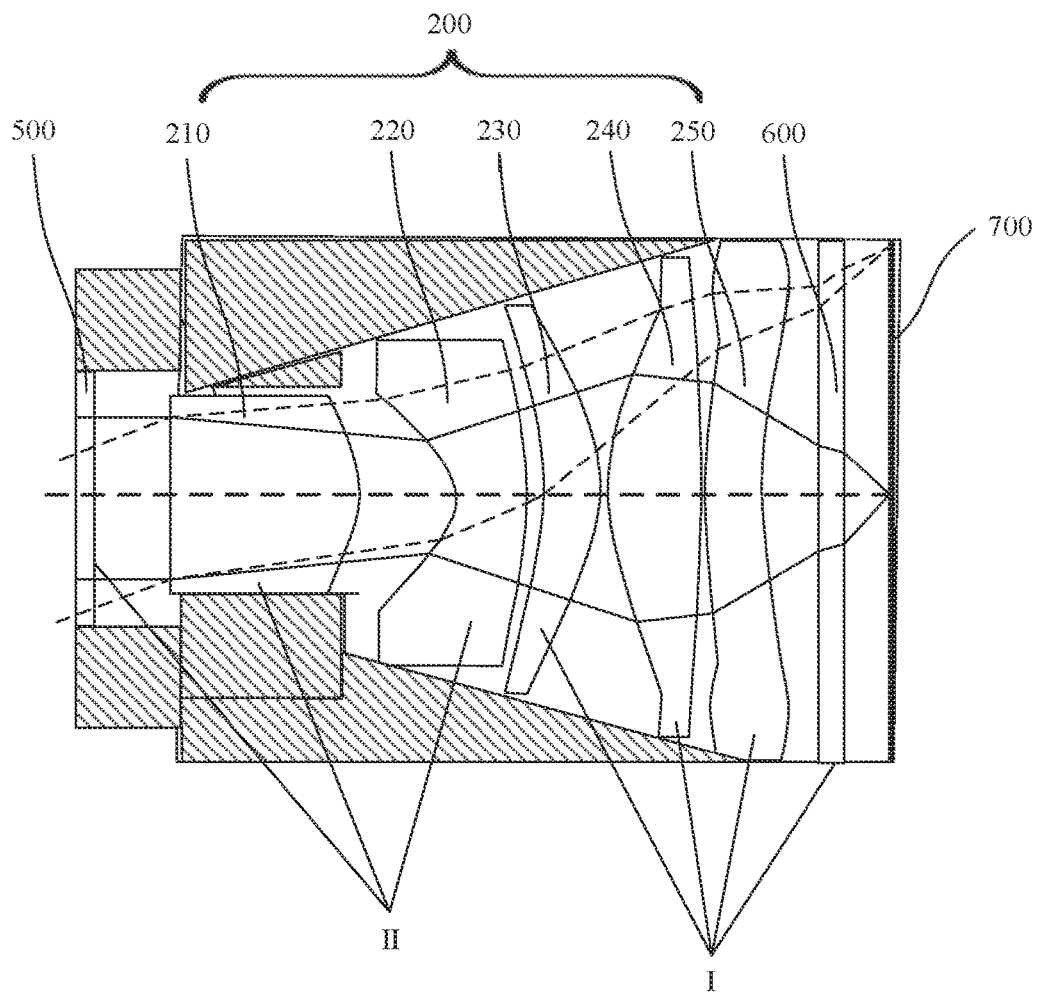
FIG. 29 is a schematic structural diagram of a camera module according to an embodiment of this application.

In some possible implementations, there may be a relatively large quantity of types selected for the optical waveguides 120 shown in FIG. 3, FIG. 5, FIG. 7, and FIG. 8. For details, refer to the foregoing description. The material included in the optical waveguide 120 is a transparent material. The material may be a common inorganic transparent glass material, or may be organic transparent plastic. This is not limited herein. There is a large selective range for the optical waveguide 120. For example, as shown in FIG. 29, when the antireflection film 110 is applied to a camera module, the antireflection film 110 may be formed on a protective diaphragm 500, a lens 400, or an infrared cut-off filter 600. The protective diaphragm 500 is any optical glass such as ultraviolet fused silica glass, infrared fused silica glass, or calcium fluoride. This is not listed herein. The lens 200 is a convex lens or a concave lens made of various materials. The infrared cut-off filter 600 is blue glass but is not limited thereto. Any material that can be used to filter out infrared light can be used.

In some possible implementations, the antireflection film 110 is not limited by the light transmission surface 121. Therefore, the light transmission surface 121 on which the plurality of convex structures 111 are formed is the light transmission surface 121 included in the optical waveguide 120 shown in FIG. 3 or FIG. 7, or the light transmission surface 121 included in the optical waveguide 120 shown in FIG. 5 or FIG. 8. The light transmission surface 121 included in the optical waveguide 120 shown in FIG. 3 or FIG. 7 is a flat light transmission surface, and the light transmission surface 121 included in the optical waveguide 120 shown in FIG. 5 or FIG. 8 is a curved light transmission surface. The curved light transmission surface may be a camber-shaped light transmission surface or a wave-shaped light transmission surface, or may be another specially shaped light transmission surface. For example, as shown in FIG. 29, the lens 200 has a camber-shaped light transmission surface, and the infrared cut-off filter 600 and the protective diaphragm 500 have flat light transmission surfaces.

When the antireflection film 110 includes the adhesive layer 112, if the light transmission surface 121 on which the anti-reflection film 110 is formed is a curved light transmission surface, as shown in FIG. 5 or FIG. 8, the adhesive layer 112 included in the antireflection film 110 is a curved adhesive layer and is fitted to a profile of the light transmission surface 121, to increase fitting performance between the adhesive layer 112 and the light transmission surface 121, so that the adhesive layer 112 and the light transmission surface 121 are in close contact with each other. When the light transmission surface 121 on which the antireflection film 110 is formed is a flat light transmission surface, as shown in FIG. 3 or FIG. 7, the adhesive layer 112 included in the antireflection film 110 is a flat incident surface, to increase fitting performance between the adhesive layer 112 and the light transmission surface 121, so that the adhesive layer 112 and the light transmission surface 121 are in close contact with each other.

Figure 15:
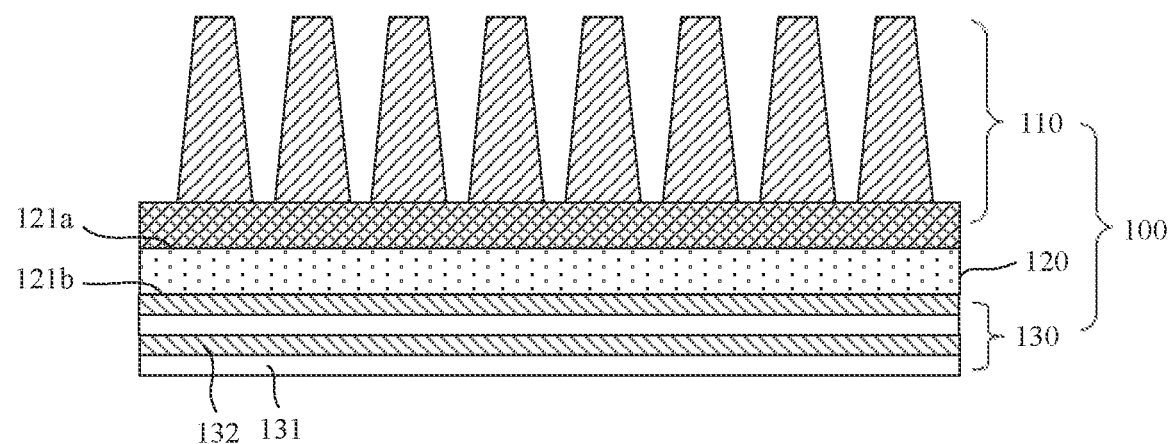
FIG. 15 is a schematic structural diagram 1 of an optical element including the antireflection film shown in FIG. 2 according to an embodiment of this application.
Figure 16:
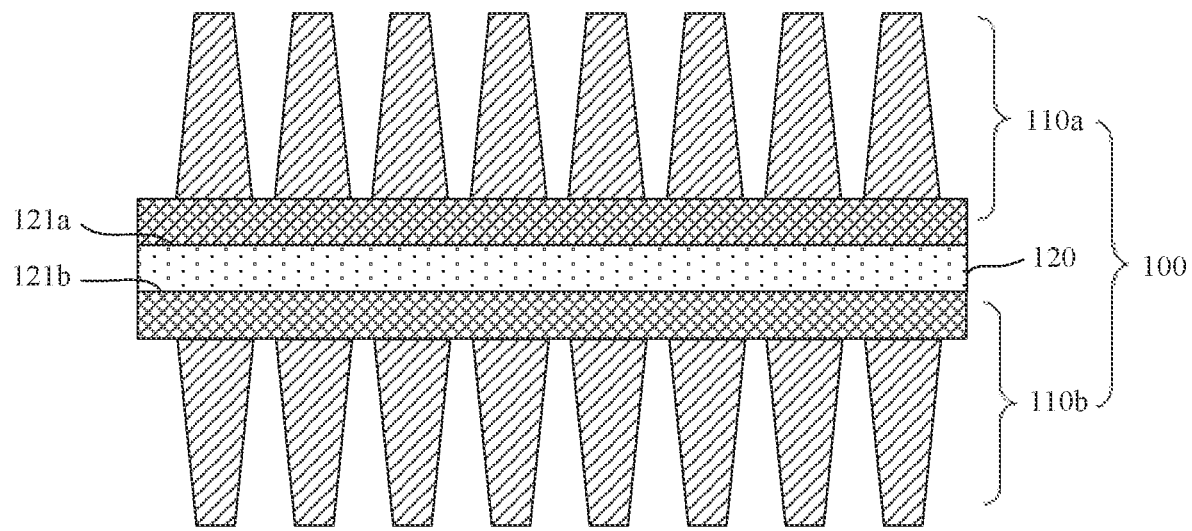
FIG. 16 is a schematic structural diagram 2 of an optical element including the antireflection film shown in FIG. 2 according to an embodiment of this application.

In some possible implementations, as shown in FIG. 15 or FIG. 16, the optical waveguide 120 includes at least a first light transmission surface 121*a* and a second light transmission surface 121*b* that are disposed opposite to each other. The antireflection film 110 may be formed on the first light transmission surface 121*a*, or may be formed on the second light transmission surface 121*b*. Certainly, the antireflection film 110 may be formed on both the first light transmission surface 121*a* and the second light transmission surface 121*b*, to further reduce reflectivity of the optical element 100.

Figure 17:
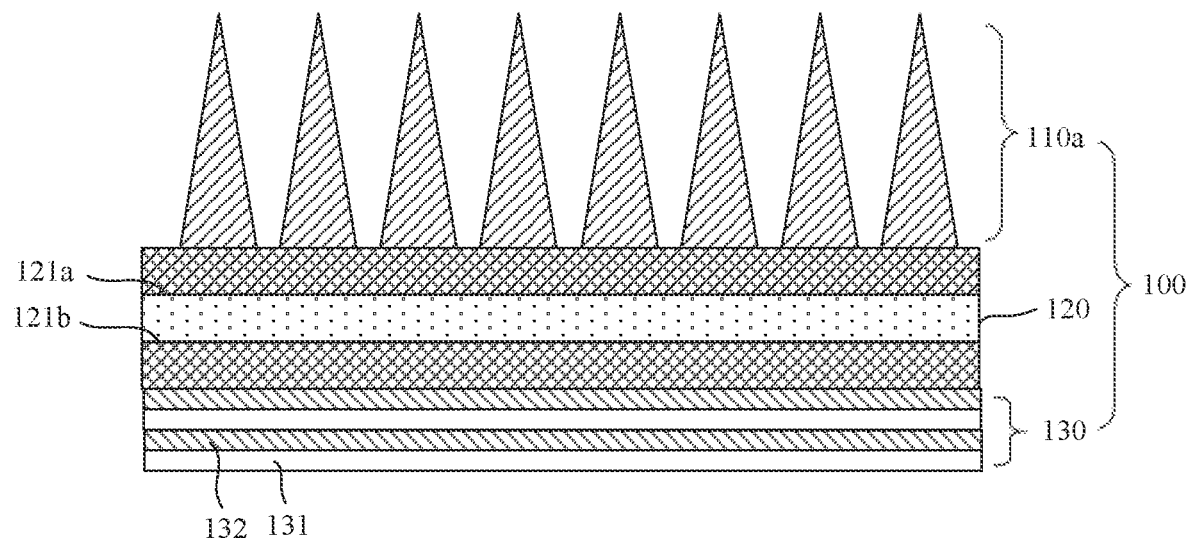
FIG. 17 is a schematic structural diagram 1 of an optical element including the antireflection film shown in FIG. 6 according to an embodiment of this application.

In an example. FIG. 15 shows an optical element 100 including an antireflection coating 130 shown in FIG. 2 according to an embodiment of this application, and FIG. 17 shows an optical element 100 including an antireflection coating 130 shown in FIG. 3 according to an embodiment of this application. As shown in FIG. 15 or FIG. 17, the antireflection film 110 is formed on the first light transmission surface 121*a*, and the antireflection coating 130 is formed on the second light transmission surface, to further reduce reflectivity of the optical waveguide 120 by using the antireflection coating 130.

To ensure good bonding performance between the antireflection coating 130 and the second light transmission surface 121*b*, the antireflection coating 130 is formed on the second light transmission surface 121*b* in a vacuum vapor deposition manner, or may be formed on the second light transmission surface 121*b* in another film forming manner such as magnetron sputtering.

The antireflection coating 130 may be a single-layer film structure, or may be a multi-layer film structure. For example, as shown in FIG. 15, the antireflection coating 130 includes a first material layer 131 and a second material layer 132 that are alternately disposed in a direction close to the second light transmission surface 121*b*. FIG. 15 shows two groups of the first material layers 131 and the second material layers 132. A refractive index of the first material layer 131 and a refractive index of the second material layer are both relatively low. The refractive index of the first material layer 131 is less than the refractive index of the second material layer 132. Therefore, the reflectivity of the optical waveguide 120 on which the antireflection coating 130 is formed is reduced by using the first material layer 131 and the second material layer 132 that are alternately disposed.

A relatively wide range of materials can be selected for the first material layer 131 and the second material layer 132. For example, the first material layer 131 is a magnesium fluoride material layer or a silicon dioxide material layer. A refractive index of magnesium fluoride included in the magnesium fluoride material layer is 1.38, and a refractive index of silicon dioxide included in the silicon dioxide material layer may range from 1.42 to 1.52 according to different preparation methods. The second material layer 132 is a titanium dioxide material layer. A refractive index of titanium dioxide included in the titanium dioxide material layer is 2.52.

Figure 18:
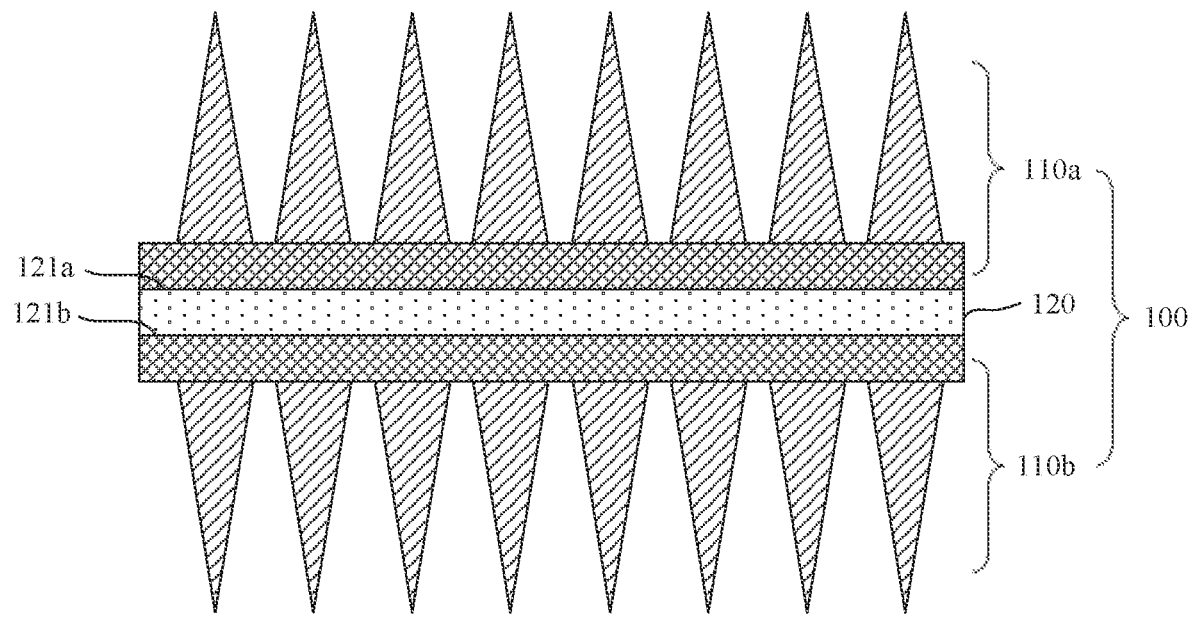
FIG. 18 is a schematic structural diagram 2 of an optical element including the antireflection film shown in FIG. 6 according to an embodiment of this application.

In another example, FIG. 16 is a schematic structural diagram of an optical element 100 including the antireflection film 110 shown in FIG. 2 according to an embodiment of this application. FIG. 18 is a schematic structural diagram of an optical element 100 including the antireflection film 110 shown in FIG. 3 according to an embodiment of this application. As shown in FIG. 16 or FIG. 18, a first antireflection film 110*a* is formed on the first light transmission surface 121*a*, and a second antireflection film 110*b* is formed on the second light transmission surface 121*b*. The first antireflection film 110*a* and the second antireflection film 110*b* are both the antireflection film shown in FIG. 2, FIG. 3, or any one of FIG. 5 to FIG. 8, to better reduce the reflectivity of the optical waveguide 120. For example, convex structures included in the first antireflection film 110*a* and the second antireflection film 110*b* may be frustum convex structures shown in FIG. 16, or may be needle-like convex structures or tapered convex structures shown in FIG. 18.

It should be understood that, as shown in any one of FIG. 15 to FIG. 18, when the first light transmission surface 121*a* is an optical waveguide in-light surface, the second light transmission surface 121*b* is an optical waveguide out-light surface; and when the first light transmission surface 121*a* is an optical waveguide out-light surface, the second light transmission surface 121*b* is an optical waveguide in-light surface.

Figure 19:
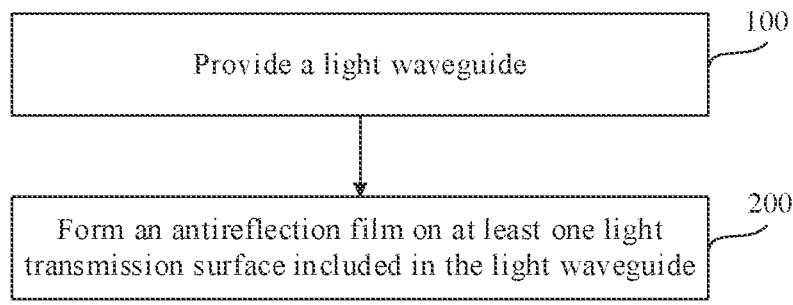
FIG. 19 is a flowchart 1 of a method for manufacturing an optical element according to an embodiment of this application.

As shown in FIG. 19, an embodiment of this application further provides a method for manufacturing an optical element. The method for manufacturing an optical element 100 includes the following steps:

Step 100: Provide an optical waveguide.

Step 200: Form a thin antireflection film on at least one light transmission surface included in the optical waveguide.

The optical element manufactured by using the method for manufacturing an optical element provided in this embodiment of this application includes not only the optical waveguide, but also the antireflection film described above.

As shown in FIG. 3, the antireflection film includes the plurality of convex structures 111 formed on the at least one light transmission surface 121 included in the optical waveguide 120. A maximum radial length of each convex structure 111 gradually decreases in a direction away from the light transmission surface 121. A refractive index of each convex structure 111 gradually changes in the direction away from the light transmission surface 121, to avoid a problem that reflectivity of the optical element 100 increases due to sudden changes of a refractive index of the convex structure 111 and a refractive index of the optical waveguide 120. In addition, because a distribution cycle W of the convex structures and a maximum radial length $D_1$ of a bottom surface of each convex structure are both less than a minimum value of a visible light wavelength, identification on each convex structure 111 and space between two adjacent convex structures 111 is not implemented for the visible light radiated to the antireflection film 110, and therefore, reflectivity of the optical element 100 for the visible light can be reduced by using the antireflection film 110. It is found through analysis that, when a height $H_1$ of each convex structure is greater than or equal to 310 nm, and the distribution cycle W of the convex structures is less than or equal to 220 nm, without limitation of a shape of the optical element 100, the antireflection film 110 can be used to adjust and control the reflectivity of the optical element 100 for the visible light regardless of whether the visible light is radiated to the optical element 100 in a normal incidence manner or an oblique incidence manner, so that the optical element 100 has the extremely low reflectivity for the visible light, to improve definition of a picture taken by a terminal, thereby effectively avoiding a ghost problem and a flare problem.

Figure 20:
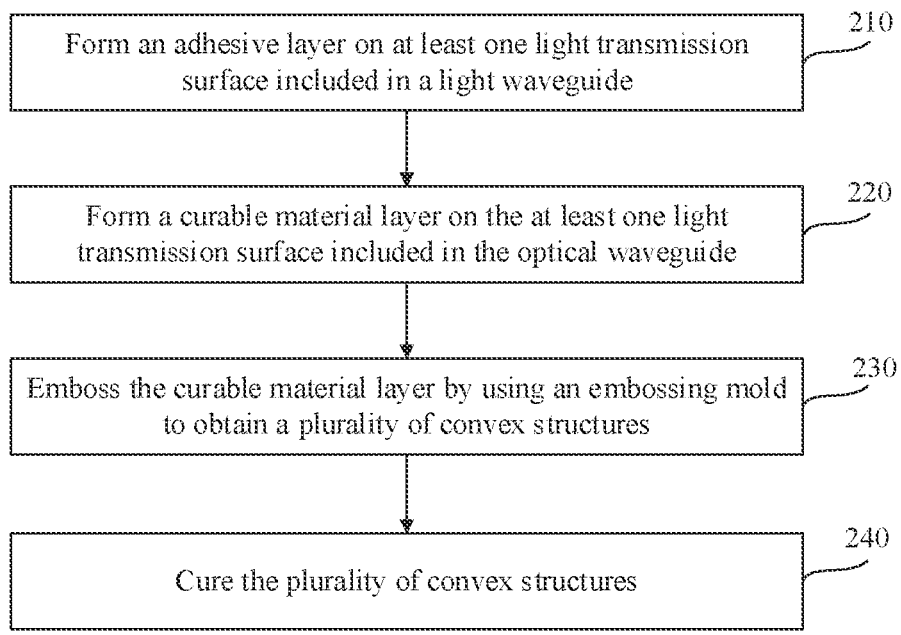
FIG. 20 is a flowchart 2 of a method for manufacturing an optical element according to an embodiment of this application.

In some possible implementations, as shown in FIG. 20, the forming a thin antireflection film on at least one light transmission surface included in the optical waveguide includes the following steps:

Step 220: Form a curable material layer on the at least one light transmission surface included in the optical waveguide. A curable material may be applied on the at least one light transmission surface in a manner such as a glue dispensing manner or a coating manner, to form the curable material layer on the light transmission surface.

Step 230: Emboss the curable material layer by using an embossing mold to obtain a plurality of convex structures.

Step 240: Cure the plurality of convex structures. A curing manner may be selected based on the curable material included in the curable material layer.

For example, the curable material included in the curable material layer is a thermocurable material. The curing the plurality of convex structures includes: curing the plurality of convex structures in a thermocuring manner. It should be understood that, before the plurality of convex structures are cured in the thermocuring manner, the embossing mold needs to be removed, and then the plurality of convex structures are cured in the thermocuring manner.

For another example, the curable material included in the curable material layer is a photocurable material, and the embossing mold is a transparent embossing mold. The curing the plurality of convex structures includes: curing the plurality of convex structures in a photocuring manner. It should be understood that, because the embossing mold is the transparent embossing mold, the embossing mold does not need to be removed after the plurality of convex structures are cured, that is, the plurality of convex structures may be cured in the photocuring manner.

In some possible embodiments, as shown in FIG. 20, before the thin antireflection film is formed on the at least one light transmission surface included in the optical waveguide, after the optical waveguide is provided, the method for manufacturing an optical element further includes the following steps:

Step 210: Form an adhesive layer on the at least one light transmission surface included in the light waveguide, where the adhesive layer is configured to bond the light transmission surface and the plurality of convex structures, to ensure that the plurality of convex structures can be stably formed on the light transmission surface and avoid damage caused to the light transmission surface when the plurality of convex structures are directly manufactured on the light transmission surface.

Figure 21:
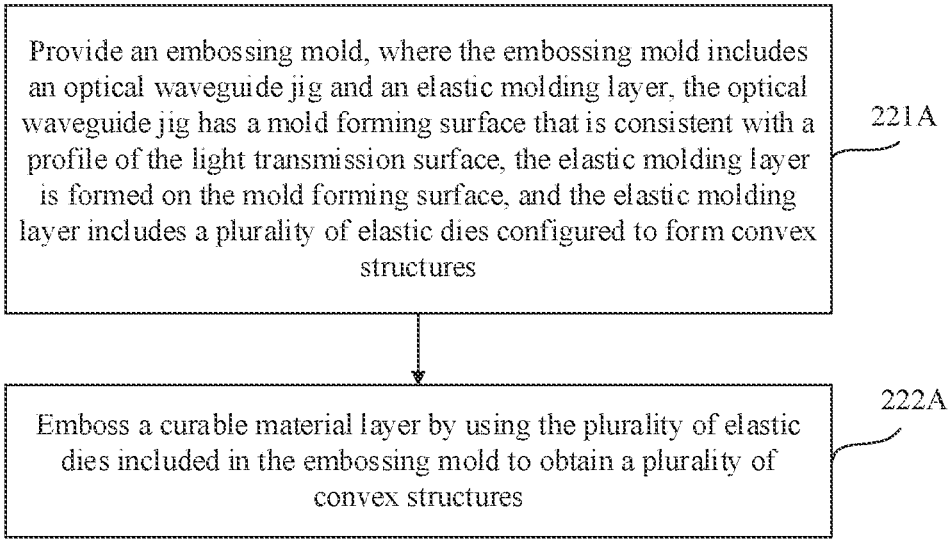
FIG. 21 is a first flowchart 1 of embossing a curable material layer by using an embossing mold according to an embodiment of this application.

In an example, the light transmission surface is a curved light transmission surface. As shown in FIG. 21, the embossing the curable material layer by using an embossing mold to obtain a plurality of convex structures includes the following steps:

Step 221A: Provide an embossing mold 300 shown in C in FIG. 24. The embossing mold 300 includes an optical waveguide jig 310 and an elastic molding layer 320. The optical waveguide jig 310 has a mold forming surface 311 that is consistent with a profile of the light transmission surface. The elastic molding layer 320 is formed on the mold forming surface 311. The elastic molding layer 320 includes a plurality of elastic dies 321 configured to form the convex structures. A thickness of the elastic molding layer 320 may be set according to an actual requirement. For example, the thickness of the elastic molding layer 320 may be set to less than 200 μm. A shape parameter and a size parameter of the elastic die 321 are set based on a size parameter of the convex structure that needs to be manufactured. For a specific size parameter of the convex structure, refer to the foregoing description.

Step 222A: Emboss the curable material layer by using the plurality of elastic dies 321 included in the embossing mold 300 to obtain the plurality of convex structures. Pressure for embossing the curable material layer by using the plurality of elastic dies 321 included in the embossing mold 300 cannot be excessively high, to avoid damage to the light transmission surface. The pressure may be set to between 0.5 MPa and 0.8 MPa.

It should be understood that the elastic molding layer 320 is tightly bonded to the optical waveguide jig 310, and no gap and no air exists between the elastic molding layer 320 and the optical waveguide jig 320. Therefore, when the mold forming surface 311 included in the optical waveguide jig 310 is consistent with the profile of the light transmission surface, the plurality of convex structures with the same shape and the same size can be formed on the light transmission surface when the plurality of elastic dies 321 are used to emboss the curable material layer. In addition, it is ensured that the plurality of convex structures are tightly bonded to the light transmission surface. However, because the plurality of elastic dies 321 are elastic, the plurality of elastic dies 321 do not damage the optical waveguide when the plurality of elastic dies 321 are used to emboss the curable material layer.

Theoretically, a profile of the mold forming surface 311 included in the optical waveguide jig 310 should be consistent with the profile of the light transmission surface. However, a specific error still exists during actual manufacturing. A PV value of the profile of the mold forming surface 311 included in the optical waveguide jig 310 and a PV value of the light transmission surface 121 may be set to less than 1 μm, to ensure that the profile of the mold forming surface 311 matches the profile of the light transmission surface 121 within a controllable range.

Figure 22:
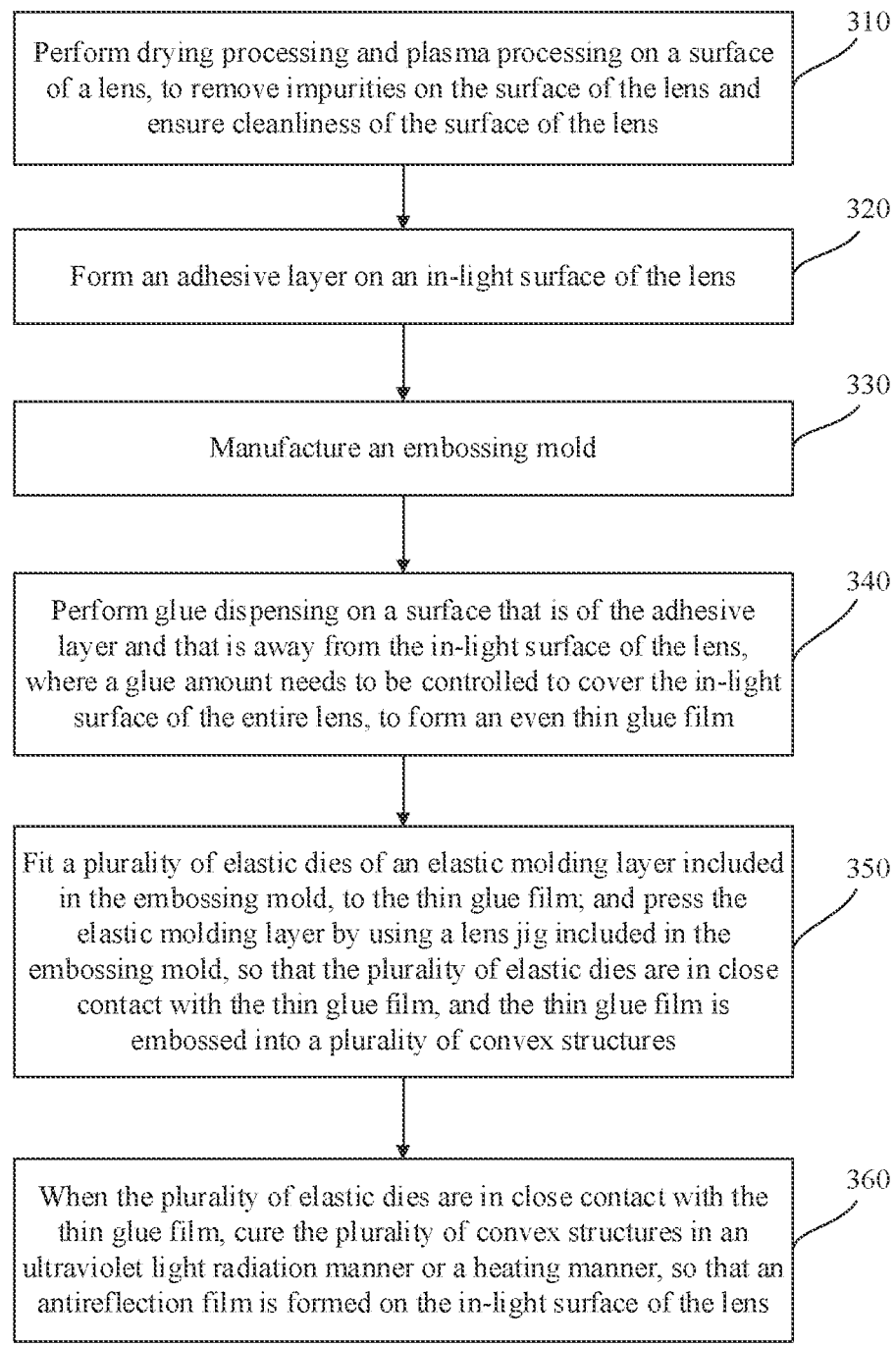
FIG. 22 is a first flowchart 2 of embossing a curable material layer by using an embossing mold according to an embodiment of this application.

To describe in more details the method for manufacturing an optical element provided in this embodiment of this application, with reference to FIG. 22, the following describes a specific process of forming the antireflection film shown in FIG. 6 on an in-light surface a of the lens 200 by using an embossing technique and a curing process when the lens 200 is used as an optical waveguide.

Step 310: Perform drying processing and plasma processing on a surface of the lens 200, to remove impurities on the surface of the lens 200 and ensure cleanliness of the surface of the lens 200. In this case, for a structure, refer to A in FIG. 24.

Step 320: Form the adhesive layer 112 shown in B in FIG. 24 on the in-light surface of the lens in consideration of the following: It is difficult to directly form the plurality of convex structures 11 on the in-light surface of the lens because a shape of the in-light surface of the lens is an arc. The adhesive layer 112 may be formed on the in-light surface of the lens by using a film forming process such as spin coating (spin-coating), dipping (dipping), or dispensing (dispensing). A parameter in the film forming process may be controlled to ensure that a height $H_0$ of the adhesive layer is less than 10 nm. A material of the adhesive layer 112 may be a conventional silane material such as a modified silane adhesive. It should be understood that a difference between a refractive index of a material used in the adhesive layer 112 and a refractive index of a material included in the lens 200 is −0.2 to 0.2, to reduce an adverse effect of a sudden refractive index change on reflectivity of the lens 200.

Figure 23:
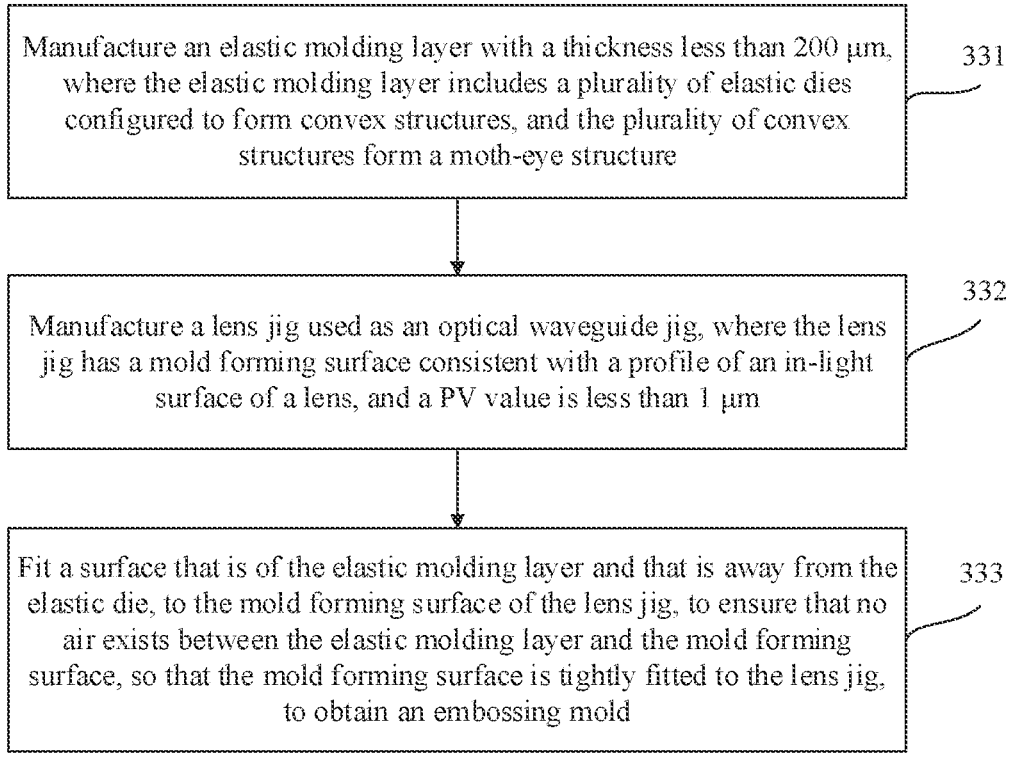
FIG. 23 is a flowchart 1 of manufacturing an embossing mold in FIG. 21.

Step 330: Manufacture the embossing mold 300 shown in C in FIG. 24. As shown in FIG. 23, a method for manufacturing the embossing mold 300 specifically includes the following steps:

Step 331: Manufacture the elastic molding layer 320 with a thickness less than 200 μm shown in C in FIG. 24. The elastic molding layer 320 includes the plurality of elastic dies 321 configured to form the convex structures. The plurality of elastic dies 321 form a moth-eye (moth-eye) structure. A parameter of each elastic die 321 is set with reference to the foregoing described parameter of the convex structure 111. The elastic molding layer 320 has ultraviolet light transmission performance. A material included in the elastic molding layer 320 may be polydimethylsiloxane (polydimethylsiloxane, PDMS for short), SU-8 photoresist, acrylic resin, or polyethylene terephthalate (polyethylene terephthalate, PET for short).

Step 332: Manufacture a lens jig used as the optical waveguide jig 310 shown in C in FIG. 24. The lens jig has a mold forming surface 311 consistent with the profile of the in-light surface of the lens 200. A PV value is less than 1 μm. A material selected for the lens jig may be an elastic material, or may be an inelastic material.

Step 333: Fit a surface that is of the elastic molding layer 320 and that is away from the elastic die 321, to the mold forming surface 311 of the lens jig, to ensure that no air exists between the elastic molding layer 320 and the mold forming surface 311. Therefore, the mold forming surface 311 is tightly fitted to the lens jig, to obtain the embossing mold 300 shown in C in FIG. 24.

Step 340: Perform glue dispensing on a surface that is of the adhesive layer 112 and that is away from the in-light surface a of the lens 200. A glue amount needs to be controlled to cover the in-light surface a of the entire lens 200, to form an even thin glue film 400. The thin glue film 400 is shown in D in FIG. 24. It should be understood that a difference between a refractive index of glue used in the glue dispensing and the refractive index of the material included in the lens 200 is −0.2 to 0.2, to reduce an adverse effect of a sudden refractive index change on the reflectivity of the lens 200. Certainly, it should be also ensured that a difference between the refractive index of the glue used in the glue dispensing and the refractive index of the material included in the adhesive layer 112 is −0.2 to 0.2, to reduce an adverse effect of a sudden refractive index change on the reflectivity of the lens 200.

Step 350: Fit the plurality of elastic dies 321 of the elastic molding layer 320 included in the embossing mold 300, to the thin glue film 400; and press the elastic molding layer 320 by using the lens jig included in the embossing mold 300, so that the plurality of elastic dies 321 are in close contact with the thin glue film 400. In this case, the thin glue film 400 is embossed into the plurality of convex structures 111. A state in this case is shown in E in FIG. 24. The pressure used in the embossing process may be set according to an actual contact case between the thin glue film 400 and the plurality of elastic dies 321, for example, 0.5 MPa to 0.8 MPa.

Step 360: When the plurality of elastic dies 321 are in close contact with the thin glue film 400, cure the plurality of convex structures 111 in an ultraviolet light radiation manner or a heating manner, so that the antireflection film 110 is formed on the in-light surface a of the lens 200; and then, remove the embossing mold 300. A state in this case is shown in F in FIG. 24. The plurality of elastic dies 321 are in close contact with the thin glue film 400. The embossing mold 300 is transparent. Therefore, when the plurality of convex structures 111 are cured in the ultraviolet light radiation manner, and it is ensured that the plurality of elastic dies 321 are in close contact with the thin glue film 400, ultraviolet light may be radiated through the embossing mold 300 onto the thin glue film 400 that is embossed into the plurality of convex structures 111.

Figure 24:
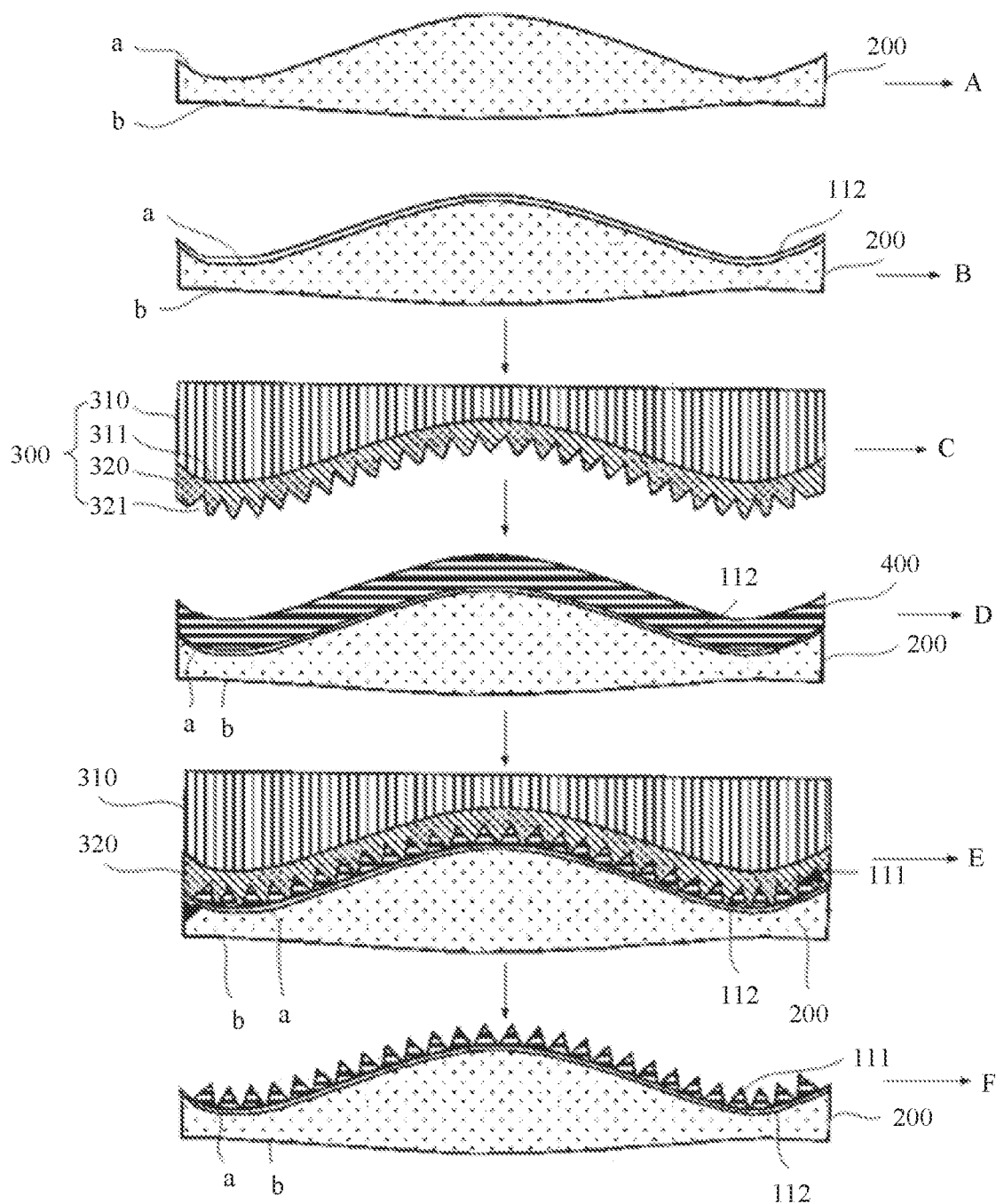
FIG. 24 is a flowchart 1 of manufacturing and embossing a curable material layer by using an embossing mold in FIG. 22.

It should be noted that, as shown in FIG. 24, step 330 does not have to be between step 320 and step 340, provided that step 330 is completed before step 350. After the antireflection film 110 is formed on the in-light surface a of the lens 200 in the foregoing manner, the antireflection film 110 may be further formed on an out-light surface b of the lens 200 in the foregoing manner.

Figure 25:
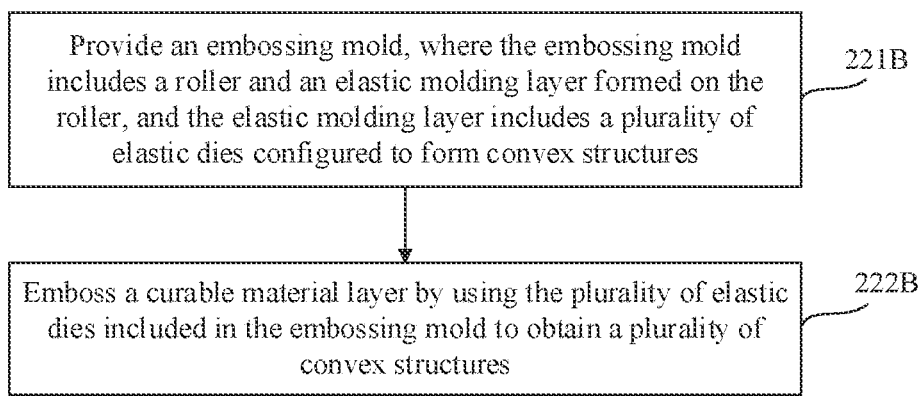
FIG. 25 is a second flowchart 1 of embossing a curable material layer by using an embossing mold according to an embodiment of this application.

In another example, the light transmission surface is a flat light transmission surface. As shown in FIG. 25, the embossing the curable material layer by using an embossing mold 300 to obtain a plurality of convex structures includes the following steps:

Step 221B: Provide an embossing mold 300 shown in C in FIG. 28. The embossing mold 300 includes a roller and an elastic molding layer 320 formed on the roller. The elastic molding layer 320 includes a plurality of elastic dies 321 configured to form the convex structures.

Step 222B: Emboss the curable material layer by using the plurality of elastic dies 321 included in the embossing mold 300 to obtain the plurality of convex structures.

Figure 28:
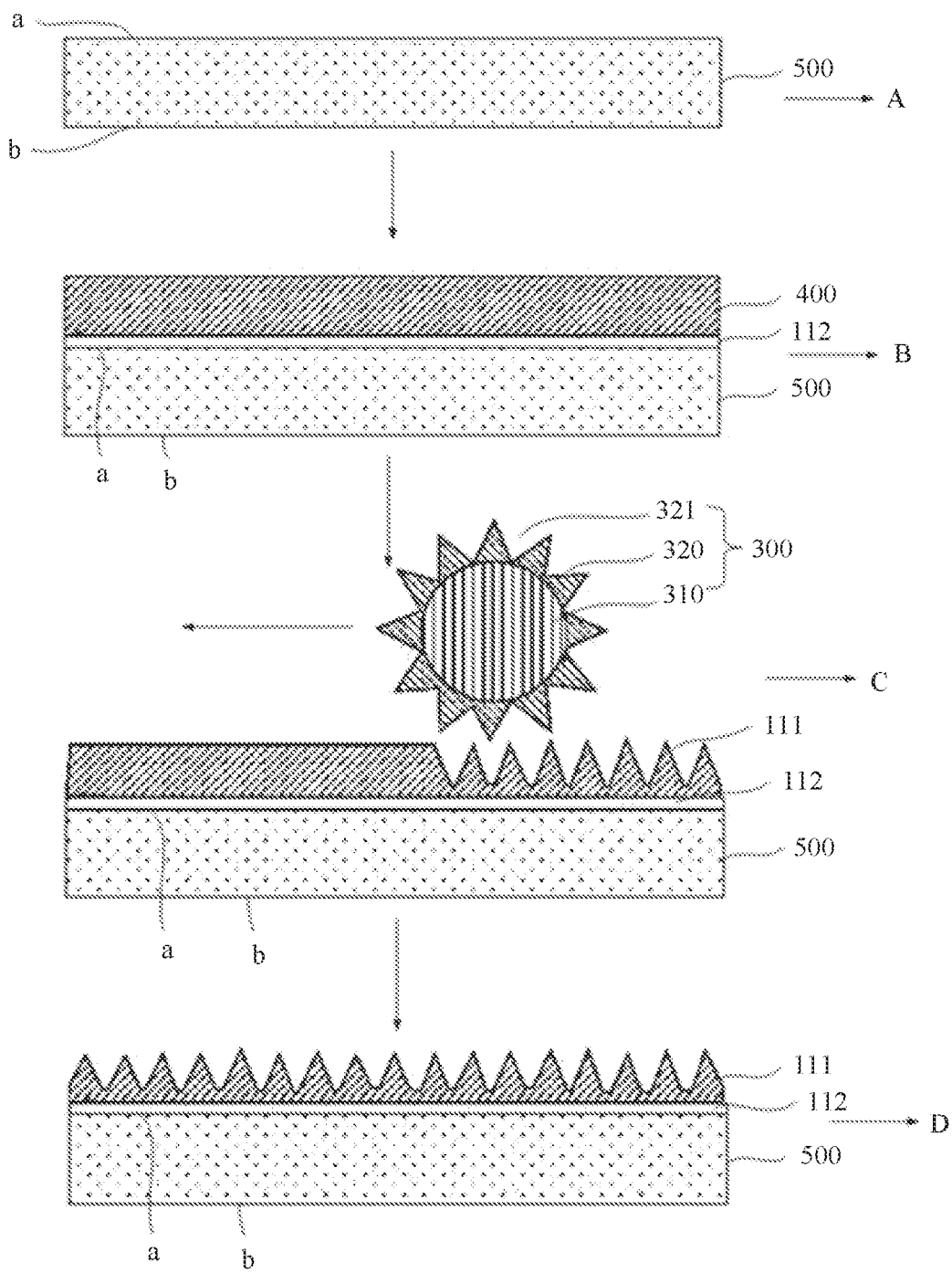
FIG. 28 is a flowchart 2 of manufacturing and embossing the curable material layer by using the embossing mold in FIG. 22.

It should be understood that, as shown in FIG. 28, for the flat light transmission surface, the plurality of convex structures 111 may be obtained through embossing the flat light transmission surface manufactured in step 330, or the plurality of convex structures 111 may be obtained through embossing in a roller embossing manner. When the plurality of convex structures 111 are obtained through embossing in the roller embossing manner, and the light transmission surface 121 is the flat light transmission surface, it is required to roll the embossing mold 300 on a surface of the curable material layer under specific pressure. In this way, the plurality of elastic dies 321 included on the elastic molding layer 320 on a surface of the roller included in the embossing mold 300 may be used to obtain the plurality of convex structures 111 on the curable material layer through embossing. Therefore, the embossing mold 300 may be used to conveniently manufacture the convex structures 111.

Figure 26:
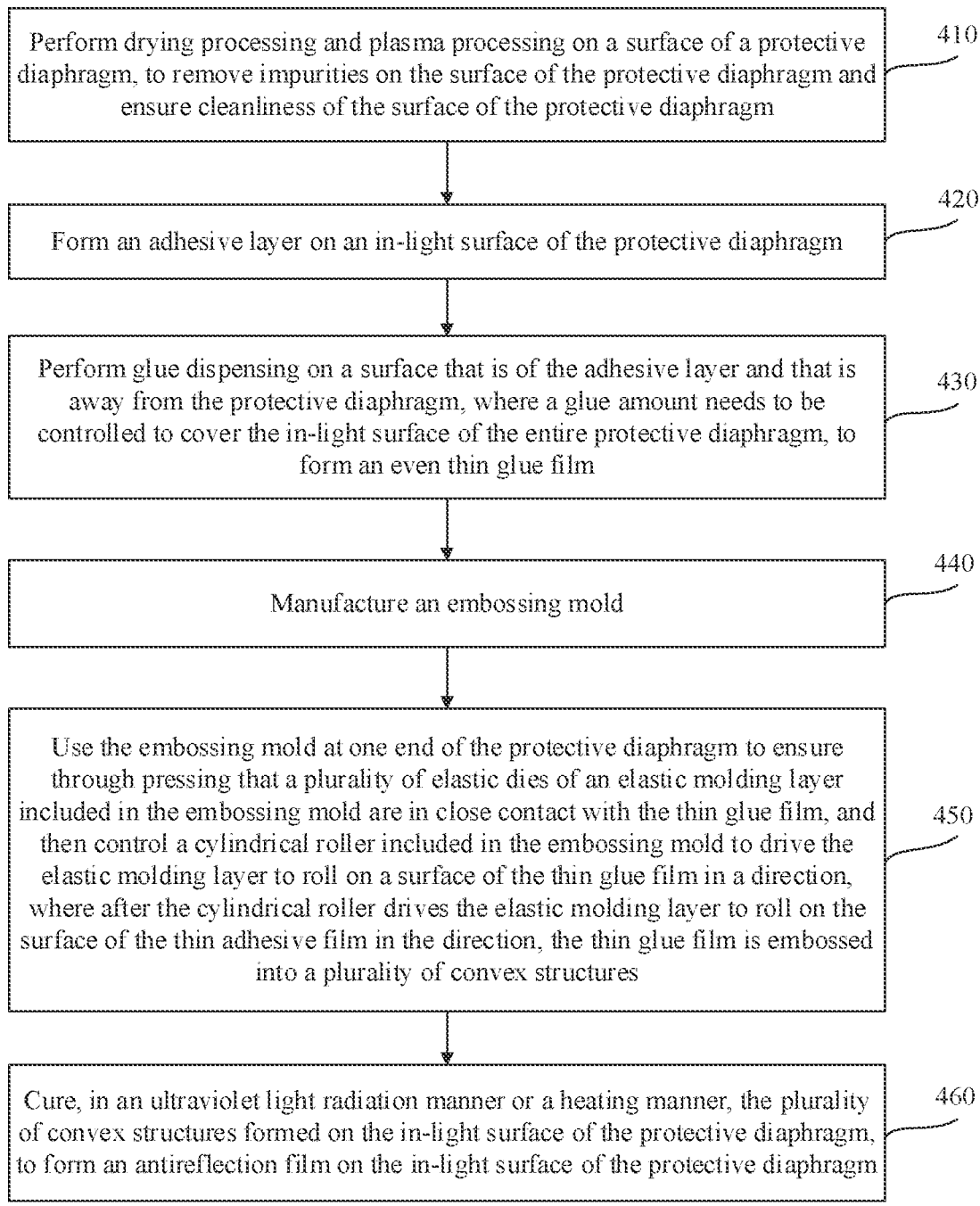
FIG. 26 is a second flowchart 2 of embossing a curable material layer by using an embossing mold according to an embodiment of this application.

To describe in more details the method for manufacturing an optical element provided in this embodiment of this application, with reference to FIG. 26, the following describes a specific process of forming the antireflection film shown in FIG. 3 on an in-light surface a of the protective diaphragm 500 by using an embossing technique and a curing process when the protective diaphragm 500 is used as an optical waveguide.

Step 410: Perform drying processing and plasma processing on a surface of the protective diaphragm 500, to remove impurities on the surface of the protective diaphragm 500 and ensure cleanliness of the surface of the protective diaphragm 500. In this case, for a structure, refer to A in FIG. 28.

Step 420: Form an adhesive layer 112 shown in B in FIG. 28 on the in-light surface a of the protective diaphragm 500. The adhesive layer 112 may be formed on the in-light surface a of the protective diaphragm 500 by using a film forming process such as spin coating (spin-coating), dipping (dipping), or dispensing (dispensing). A parameter in the film forming process may be controlled to ensure that a height $H_0$ of the adhesive layer is less than 10 nm. A material of the adhesive layer 112 may be a conventional silane material such as a modified silane adhesive. It should be understood that a difference between a refractive index of the material used in the adhesive layer 112 and a refractive index of a material included in the protective diaphragm 500 is −0.2 to 0.2, to reduce an adverse effect of a sudden refractive index change on reflectivity of the protective diaphragm 500.

Step 430: Perform glue dispensing on a surface that is of the adhesive layer 112 and that is away from the protective diaphragm 500. A glue amount needs to be controlled to cover the in-light surface a of the entire protective diaphragm 500, to form an even thin glue film 400 shown in B in FIG. 28. It should be understood that a difference between a refractive index of glue used in the glue dispensing and the refractive index of the material included in the protective diaphragm 500 is −0.2 to 0.2, to reduce an adverse effect of a sudden refractive index change on the reflectivity of the protective diaphragm 500. Certainly, it should be also ensured that a difference between the refractive index of the glue used in the glue dispensing and the refractive index of the material included in the adhesive layer 112 is −0.2 to 0.2, to reduce an adverse effect of a sudden refractive index change on the reflectivity of the protective diaphragm 500. It should be understood that the protective diaphragm 500 is a flat structure. A surface of the protective diaphragm 500 is relatively smooth. This is convenient for forming the convex structure 111. Therefore, based on a magnitude of adhesion between the material used in the glue dispensing and the in-light surface a of the protective diaphragm, it may be determined whether the adhesive layer 112 needs to be formed. For example, when the material used in the glue dispensing is well adhered to the in-light surface a of the protective diaphragm 500, after step 410, the glue dispensing is directly performed on the in-light surface a of the protective diaphragm 500 to form the even thin glue film 400.

Figure 27:
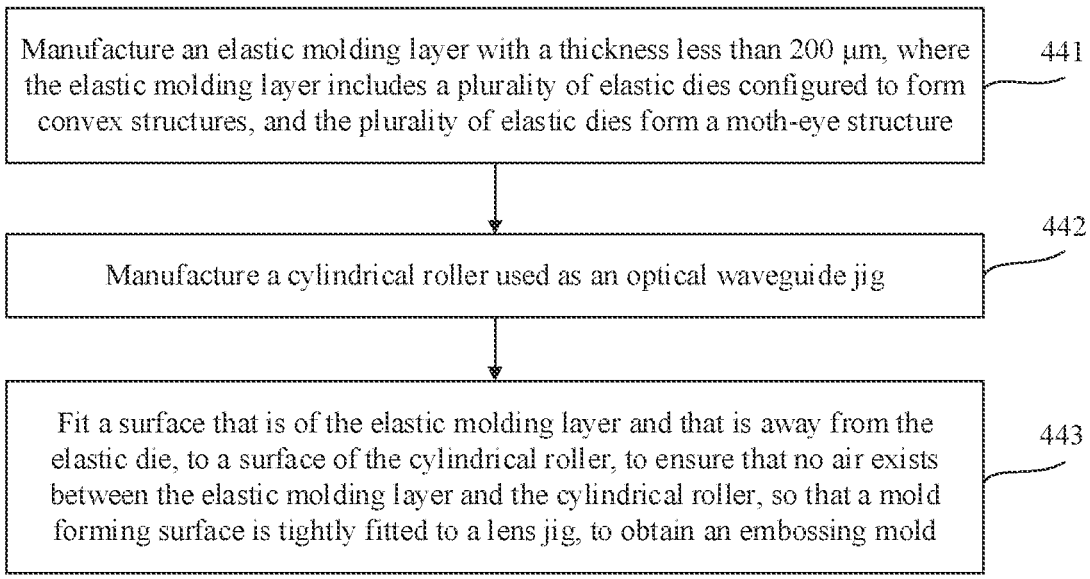
FIG. 27 is a flowchart 1 of manufacturing the embossing mold in FIG. 25.

Step 440: Manufacture an embossing mold 300 shown in C in FIG. 28. As shown in FIG. 27, a method for manufacturing the embossing mold 300 specifically includes the following steps:

Step 441: Manufacture the elastic molding layer 320 with a thickness less than 200 μm shown in C in FIG. 28. The elastic molding layer 320 includes the plurality of elastic dies 321 configured to form the convex structures 111. The plurality of elastic dies 321 form a moth-eye (moth-eye) structure. A parameter of each elastic die 321 is set with reference to the foregoing described parameter of the convex structure 111. The elastic molding layer 320 has ultraviolet light transmission performance. A material included in the elastic molding layer 320 may be polydimethylsiloxane (polydimethylsiloxane, PDMS for short), SU-8 photoresist, acrylic resin, or polyethylene terephthalate (polyethylene terephthalate, PET for short).

Step 442: Manufacture a cylindrical roller used as the optical waveguide jig 310 shown in C in FIG. 28. A material selected for the cylindrical roller may be an elastic material, or may be an inelastic material.

Step 443: Fit a surface that is of the elastic molding layer 320 and that is away from the elastic die 321, to a surface of the cylindrical roller, to ensure that no air exists between the elastic molding layer 320 and the cylindrical roller. Therefore, the mold forming surface 311 is tightly fitted to the cylindrical roller, to obtain the embossing mold 300.

Step 450: Use the embossing mold 300 at one end of the protective diaphragm 500 to ensure through pressing that the plurality of elastic dies 321 of the elastic molding layer 320 included in the embossing mold 300 are in close contact with the thin glue film 400, and then control the cylindrical roller included in the embossing mold 300 to drive the elastic molding layer 320 to roll on a surface of the thin glue film 400 in a direction. After the cylindrical roller drives the elastic molding layer 320 to roll on the surface of the thin adhesive film 400 in the direction, the thin glue film 400 is embossed into the plurality of convex structures 111. The pressure used in the embossing process may be set according to an actual contact case between the thin glue film 400 and the plurality of elastic dies 321, for example, 0.5 MPa to 0.8 MPa.

It should be understood that, when the cylindrical roller is used to drive the elastic molding layer 320 to roll on the surface of the thin glue film 400 in a left arrow direction of the embossing mold 300 shown in C in FIG. 28, a gap easily occurs between the cylindrical roller and the elastic molding layer 320. Therefore, air enters between the cylindrical roller and the elastic molding layer 320, causing a deviation of precision of the convex structures 111 obtained through the embossing. On this basis, after the embossing is completed, whether air exists between the cylindrical roller and the elastic molding layer 320 may be checked, to determine whether the precision of the convex structures 111 obtained after the embossing is abnormal.

Step 460: Cure, in an ultraviolet light radiation manner or a heating manner, the plurality of convex structures 111 formed on the in-light surface a of the protective diaphragm 500, to form the antireflection film 110 on the in-light surface a of the protective diaphragm 5X).

It should be noted that, as shown in FIG. 26, step 440 does not have to be between step 430 and step 450, provided that step 440 is completed before step 450. After the antireflection film is formed on the in-light surface a of the protective diaphragm 500 in the foregoing manner, the antireflection film may be further formed on an out-light surface b of the protective diaphragm 500 in the foregoing manner.

As shown in FIG. 3 or FIG. 7, the thickness of the antireflection film 110 included in the optical element 100 may be 200 nm to 600 nm. Alternatively, a proper range may be further selected within the range of 200 nm to 600 nm, so that the optical element 100 has relatively low reflectivity. For example, the thickness of the antireflection film 110 is greater than 310 nm and less than 460 nm. For another example, the thickness of the antireflection film is greater than 300 nm and less than 450 nm. A thickness $H_0$ of the adhesive layer 112 included in the antireflection film 110 should be controlled within 0 nm to 200 nm. When the thickness $H_0$ of the adhesive layer 112 is equal to 0 nm, the antireflection film 110 essentially does not include the adhesive layer 112. In this case, the convex structures 111 included in the antireflection film 110 are tightly bonded to the surface of the optical waveguide.

As shown in FIG. 29, an embodiment of this application provides a camera module. The camera module includes at least one first-type optical element I. The first-type optical element is the optical element 100 shown in any one of FIG. 5 to FIG. 8.

The first-type optical element I included in the camera module provided in this embodiment of this application is the optical element described above. Therefore, the first-type optical element I includes not only the optical waveguide 120, but also the antireflection film 110 described above. The antireflection film 110 includes the plurality of convex structures 111 formed on the at least one light transmission surface 121 included in the optical waveguide 120. A maximum radial length of each convex structure 111 gradually decreases in a direction away from the light transmission surface 121. A refractive index of each convex structure 111 gradually changes in the direction away from the light transmission surface 121, to avoid a problem that reflectivity of the optical element 100 increases due to sudden changes of a refractive index of the convex structure 111 and a refractive index of the optical waveguide 120. In addition, because a distribution cycle W of the convex structures and a maximum radial length $D_1$ of a bottom surface of each convex structure are both less than a minimum value of a visible light wavelength, identification on each convex structure 111 and space between two adjacent convex structures 111 is not implemented for the visible light radiated to the antireflection film 110, and therefore, reflectivity of the optical element 100 for the visible light can be reduced by using the antireflection film 110. It is found through analysis that, when a height $H_1$ of each convex structure 111 is greater than or equal to 310 nm, and the distribution cycle W of the convex structures is less than or equal to 220 nm, without limitation of a shape of the optical element 100, the antireflection film 110 can be used to adjust and control the reflectivity of the optical element 100 for the visible light regardless of whether the visible light is radiated to the optical element 100 in a normal incidence manner or an oblique incidence manner, so that the optical element 100 has the extremely low reflectivity for the visible light.

It should be understood that, as shown in FIG. 29, one to two lenses having a structure of the first-type optical element I may be set for a lens group configured on a terminal such as a common mobile phone. However, at least three lenses having the structure of the first-type optical element I need to be set for an ultra wide lens.

Figure 30:
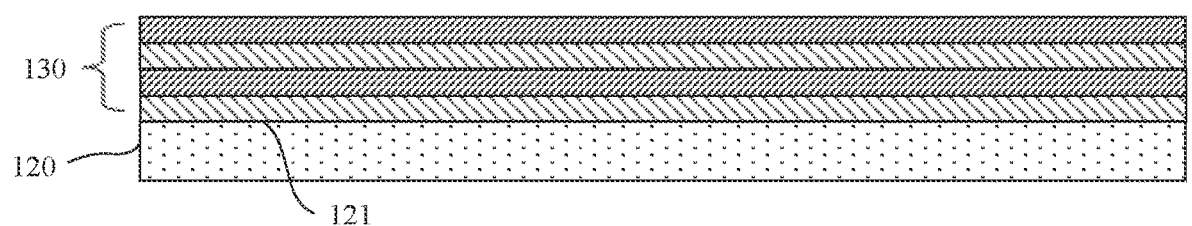
FIG. 30 is a schematic diagram of another optical element according to an embodiment of this application.

In some possible implementations, as shown in FIG. 29 and FIG. 30, the camera module further includes at least one second-type optical element II. The second-type optical element II includes not only the optical waveguide 120, but also an antireflection coating 130 formed on the light transmission surface 121 included in the optical waveguide 120, to improve a light collection rate of the camera module.

In some possible implementations, as shown in FIG. 29, the camera module further includes an image sensor 700. The first-type optical element I and the second-type optical element II are located in a direction in which a sensing surface of the image sensor 700 is located, so that the visible light can be collected by the image sensor 700 after passing through the first-type optical element I and the second-type optical element II. However, because the first-type optical element I has extremely low reflectivity for the visible light, the image sensor 700 can collect almost all visible light reflected by scenery photographed by the camera module, to improve definition of the scenery photographed by the camera module, thereby avoiding a ghost problem and a flare problem.

It should be understood that a position relationship between the first-type optical element I and the second-type optical element II is determined based on functions of the first-type optical element I and the second-type optical element II in the camera module. FIG. 29 shows a camera module provided in this application. The camera module includes a protective diaphragm 500, a plurality of lenses 200, an infrared cut-off filter 600, and an image sensor 700. The protective diaphragm 500, the plurality of lenses, and the infrared cut-off filter 600 are sequentially disposed in a direction close to a sensing surface of the image sensor 700.

At least one of the protective diaphragm 500, the plurality of lenses 200, and the infrared cut-off filter 600 may select a structure of the foregoing first-type optical element I, and the remaining may select a structure of the foregoing second-type optical element II. It should be understood that a quantity of the foregoing lenses 200 may be 4, 6, or 7. However, this is not limited thereto. The quantity may be set according to an actual requirement of the camera module.

For example, when the quantity of the foregoing lenses 200 is 5, in the direction close to the sensing surface of the image sensor 70), the third lens 230, the fourth lens 240, the fifth lens 250, and the infrared cut-off filter 600 are all set to first-type optical elements I; and the first lens 210, the second lens 220, and the protective diaphragm 500 are all set to a structure of the second-type optical element II shown in FIG. 30. A material selected for the protective diaphragm 500 is Gorilla glass produced in the Corning Incorporated. The infrared cut-off filter 600 is blue glass for filtering out infrared light.

Figure 31:
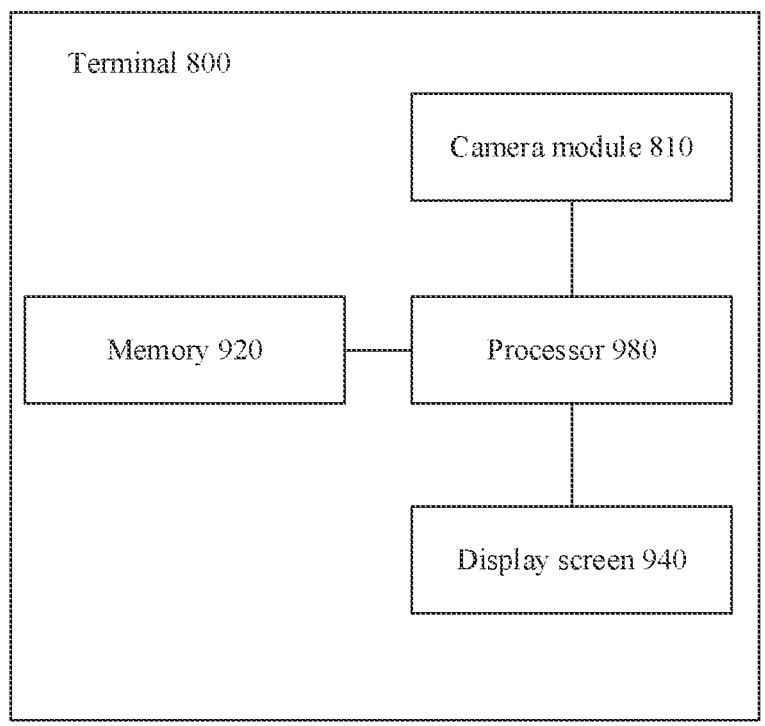
FIG. 31 is a schematic structural diagram of a terminal according to an embodiment of this application.

As shown in FIG. 31, an embodiment of this application further provides a terminal 800. The terminal 800 includes a camera module 810. In the terminal 800 provided in this application, a first-type optical element I included in the camera module 810 includes not only the optical waveguide 120 but also the antireflection film. As shown in FIG. 3, the antireflection film 110 includes the plurality of convex structures 111 formed on the at least one light transmission surface 121 included in the optical waveguide 120. A maximum radial length of each convex structure 111 gradually decreases in a direction away from the light transmission surface 121. A refractive index of each convex structure 111 gradually changes in the direction away from the light transmission surface 121, to avoid a problem that reflectivity of the optical element 100 increases due to sudden changes of the refractive index of the convex structure 111 and the refractive index of the optical waveguide 120. In addition, because a distribution cycle W of the convex structures and a maximum radial length $D_1$ of a bottom surface of each convex structure are both less than a minimum value of a visible light wavelength, identification on each convex structure 111 and space between two adjacent convex structures 111 is not implemented for the visible light radiated to the antireflection film 110, and therefore, reflectivity of the optical element 100 for the visible light can be reduced by using the antireflection film 110. It is found through analysis that, when a height $H_1$ of each convex structure is greater than or equal to 310 nm, and the distribution cycle W of the adjacent convex structures is less than or equal to 220 nm, without limitation of a shape of the optical element 100, the antireflection film 110 can be used to adjust and control the reflectivity of the optical element 100 for visible light regardless of whether the visible light is radiated to the optical element 100 in a normal incidence manner or an oblique incidence manner, so that the optical element 100 has extremely low reflectivity for the visible light, to improve definition of a picture taken by the terminal, thereby avoiding a ghost problem and a flare problem.

In some possible implementations, as shown in FIG. 31, the terminal further includes a processor 980, a memory 920, and a display screen 940. The processor 980 is separately electrically connected to the camera module 810, the memory 920, and the display screen 940.

The memory 920 is configured to store a computer instruction. When the computer instruction is run, the processor is enabled to process at least image data transmitted by the camera module, and certainly also process internal data of the terminal or process data transmitted by an external device when the external device accesses the terminal. The memory 920 may be a storage apparatus, or may be a general name of a plurality of storage elements. The memory 920 is configured to store executable program code and the like. The memory 920 may include a random access memory (RAM) or may include a non-volatile memory 920 (non-volatile memory), such as a magnetic disk storage 920 or a flash memory (flash).

The processor 980 may be a processor, or may be a general name of a plurality of processing elements. For example, the processor may be a central processing unit (central processing unit, CPU for short), or an application-specific integrated circuit (application-specific integrated circuit, ASIC for short), or may be configured as one or more integrated circuits implementing this embodiment of the present invention, for example, one or more microprocessors (digital signal processors, DSP for short) or one or more field programmable gate arrays (field programmable gate array, FPGA for short).

The display screen 940 is configured to: display at least a picture collected by the camera module, and certainly, display an image stored in the terminal or display an image transmitted by the external device when the external device accesses the terminal. The display screen 940 may be a display unit, for example, an organic electroluminescent display or a liquid crystal display.

In some possible implementations, the terminal 800 may include a mobile phone, a tablet computer, a personal digital assistant (personal digital assistant, PDA), a point of sale (point of sale, POS), a vehicle-mounted computer, and the like.

Figure 32:
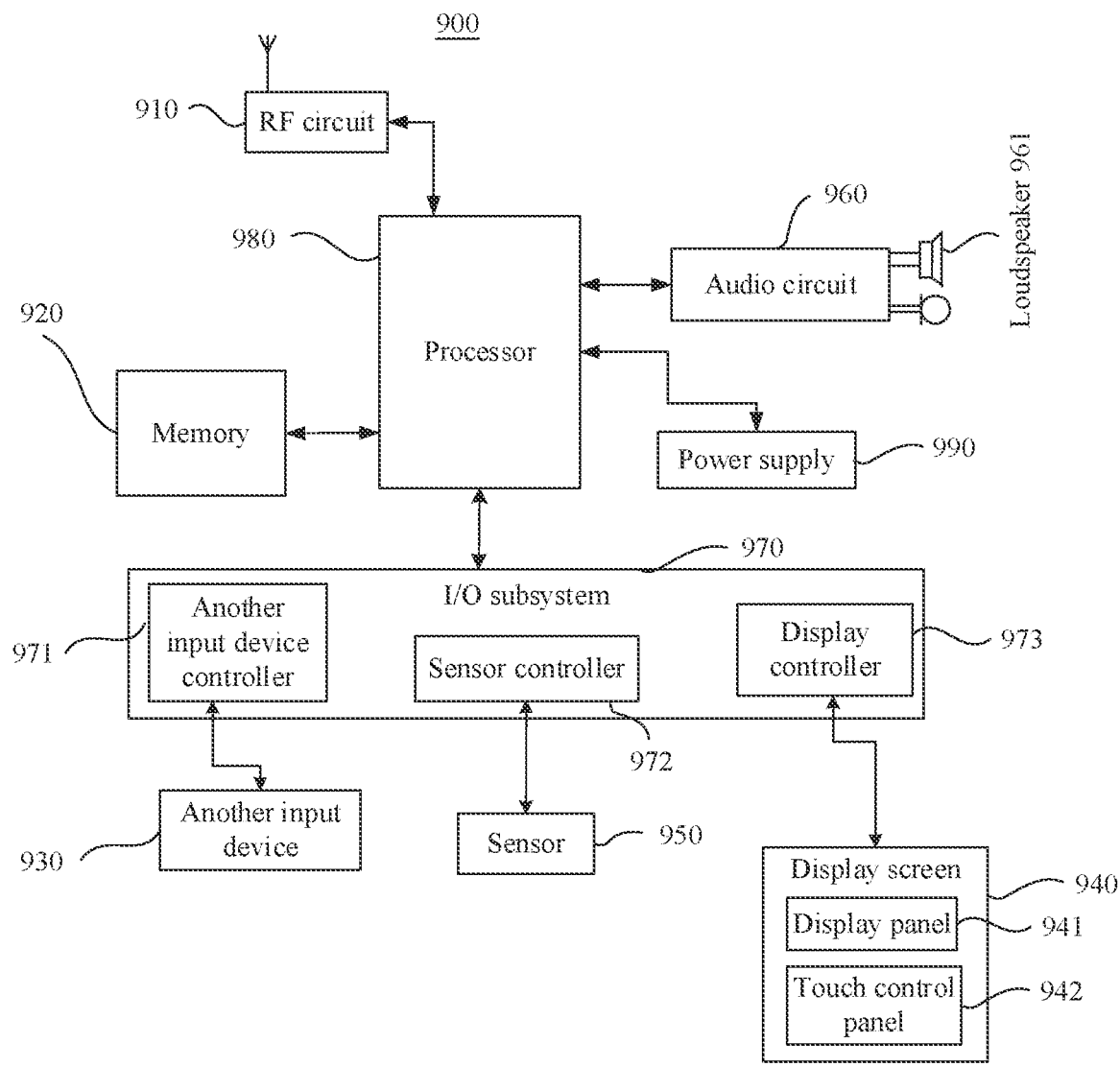
FIG. 32 is a block diagram of a partial structure of a mobile phone used as a terminal according to an embodiment of this application.

A mobile phone 900 shown in FIG. 32 is used as an example of the terminal 800. FIG. 32 is a block diagram of a partial structure of the mobile phone 900 used as the terminal according to an embodiment of this application. As shown in FIG. 32, the mobile phone 100 includes components such as a camera module, a radio frequency (radio frequency, RF) circuit 110, a memory 920, another input device 930, a display 940, a sensor, an audio circuit 960, an I/O subsystem 170, a processor 980, and a power supply 990. The camera module is a camera module. The camera module includes a protective diaphragm 500, a plurality of lenses 200, and an infrared cut-off filter 600. The antireflection film 110 with a similar refractive index is formed on an in-light surface or an out-light surface of at least one of the protective diaphragm 500, the plurality of lenses 200, and the infrared cut-off filter 600. The antireflection film 110 includes an adhesive layer 112 and a plurality of convex structures 111 formed on the adhesive layer 112. The adhesive layer 112 is configured to bond the plurality of convex structures 111 and the out-light surface and/or the in-light surface of the at least one of the protective diaphragm 500, the plurality of lenses 200, and the infrared cut-off filter 600. A height $H_1$ of each convex structure is 310 nm to 450 nm. A distribution cycle W of the convex structures is 160 nm to 220 nm.

A person skilled in the art may understand that a structure of the mobile phone shown in FIG. 32 constitutes no limitation on the mobile phone, and the mobile phone may include more or fewer components than those shown in the figure, or some components may be combined, or some components may be split, or different component arrangement may be used. A person skilled in the art may understand that the display screen 940 belongs to a user interface (user interface, UI), and the mobile phone may include more or fewer user interfaces than those shown in the figure. The following describes all components of the mobile phone 100 in detail with reference to FIG. 32.

The RF circuit 910 may be configured to: receive and send information, or receive and send a signal in a call process; after receiving downlink information of a base station, send the downlink information to the processor 980 for processing, and send related uplink data to the base station. Generally, the RF circuit 910 includes but is not limited to an antenna, at least one amplifier, a transceiver, a coupler, a low noise amplifier (low noise amplifier, LNA), a duplexer, and the like. In addition, the RF circuit 910 may further communicate with a network and another device through wireless communication. The wireless communication may use any communication standard or protocol that includes but is not limited to a global system for mobile communications (Global System for Mobile Communications, GSM), a general packet radio service (general packet radio service, GPRS), code division multiple access (Code Division Multiple Access, CDMA), wideband code division multiple access (Wideband Code Division Multiple Access, WCDMA), long term evolution (Long Term Evolution, LTE), an email, a short message service (short message service, SMS), and the like.

The memory 920 may be configured to store a software program and a module. The processor 980 performs various functional applications of the mobile phone and processes data by running the software program and the module stored in the memory 920. The memory 920 may mainly include a program storage region and a data storage region. The program storage region may store an operating system, an application program required by at least one function (such as a sound play function or an image play function), and the like. The data storage region may store data (such as audio data or an address book) created based on use of the mobile phone, and the like. In addition, the memory 920 may include a high-speed random access memory, and may further include a nonvolatile memory, for example, at least one magnetic disk storage device, a flash storage device, or another volatile solid-state storage device.

The another input device 930 may be configured to: receive input digit or character information, and generate key signal input related to user setting and function control of the mobile phone. Specifically, the another input device 930 may include but is not limited to one or more of a physical keyboard, a function key (such as a volume control key or an on/off key), a trackball, a mouse, a joystick, and an optical mouse (the optical mouse is a touch-sensitive surface that does not display visual output, or an extension of a touch-sensitive surface formed by a touchscreen). The another input device 930 is connected to another input device controller 971 of the I/O subsystem, and exchanges a signal with the processor 980 under control of the another input device controller 971.

The display screen 940 may be configured to display information entered by a user or information provided to a user, and various menus of the mobile phone; and may further receive user input. Specifically, the display screen 940 may include a display panel 941 and a touch panel 942. The display panel 941 may be configured in a form of a liquid crystal display (liquid crystal display, LCD), an organic light-emitting diode (organic light-emitting diode, OLED), or the like. The touch panel 942 is also referred to as a touchscreen, a touch-sensitive screen, or the like, and may collect a touch or non-touch operation (for example, an operation performed by the user on or near the touch panel 942 by using any proper object or accessory such as a finger or a stylus; or a motion sensing operation, where the operation includes a single-point control operation, a multi-point control operation, or a similar type of operation) performed by the user on or near the touch panel 942, and drive a corresponding connection apparatus based on a preset program. Optionally, the touch panel 942 may include two parts: a touch detection apparatus and a touch controller. The touch detection apparatus detects a touch position and gesture of the user, detects a signal brought by a touch operation, and transmits the signal to the touch controller. The touch controller receives touch information from the touch detection apparatus, converts the touch information into information that can be processed by the processor 980, and then sends the information to the processor 980; and can receive and execute a command sent by the processor 980. In addition, the touch panel 942 may be implemented by using a plurality of types such as a resistive type, a capacitive type, an infrared ray, and a surface acoustic wave; or the touch panel 942 may be implemented by using any technology developed in the future. Further, the touch panel 942 may cover the display panel 941. The user may perform, based on content displayed on the display panel 941 (the displayed content includes but is not limited to a soft keyboard, a virtual mouse, a virtual key, an icon, and the like), an operation on or near the touch panel 942 that covers the display panel 941. After detecting the operation on or near the touch panel 942, the touch panel 942 transmits the operation to the processor 980 by using the I/O subsystem, to determine user input. Then, the processor 980 provides corresponding visual output on the display panel 941 based on the user input by using the I/O subsystem. In FIG. 32, the touch panel 942 and the display panel 941 are used as two independent components to implement input and input functions of the mobile phone. However, in some embodiments, the touch panel 942 and the display panel 941 may be integrated to implement the input and output functions of the mobile phone.

The mobile phone may further include at least one type of sensor 950, such as a light sensor (for example, the image sensor 700 shown in FIG. 29), a motion sensor, or another sensor. Specifically, the light sensor may include an ambient light sensor and a proximity sensor. For example, the image sensor 700 included in the camera module is one type of light sensor. Image information collected by the camera module shown in FIG. 29 may be transmitted to the processor 980. The ambient light sensor may adjust luminance of the display panel 941 based on brightness of ambient light, and the proximity sensor may close the display panel 941 or backlight when the mobile phone approaches an ear. As a type of the motion sensor, an acceleration sensor may detect a value of an acceleration in each direction (generally, three axes), may detect a value and a direction of gravity in a static state, and may be used in an application for identifying a mobile phone posture (such as screen switching between landscape and portrait modes, a related game, or magnetometer posture calibration), a function related to vibration identification (such as a pedometer or a knock), and the like. For another sensor such as a gyroscope, a barometer, a hygrometer, a thermometer, or an infrared sensor that may be further disposed on the mobile phone, details are not described herein.

The audio circuit 960, the loudspeaker 961, and the microphone may provide an audio interface between the user and the mobile phone. The audio circuit 960 may convert received audio data into a signal and transmit the signal to the loudspeaker 961, and the loudspeaker 961 converts the signal into a sound signal and outputs the sound signal. In addition, the microphone converts a collected sound signal into a signal; and the audio circuit 960 receives the signal, converts the signal into audio data, and outputs the audio data to the RF circuit 910 to send the audio data to, for example, another mobile phone, or outputs the audio data to the memory 920 for further processing.

The I/O subsystem is configured to control an external input/output device, and may include the another input device controller 971, a sensor controller 972, and a display controller 973. Optionally, one or more other input control device controllers 971 receive a signal from the another input device 930 and/or send a signal to the another input device 930. The another input device 930 may include a physical button (such as a press button or a rocker button), a dial pad, a slider switch, a joystick, a click scroll wheel, and an optical mouse (the optical mouse is a touch-sensitive surface that displays no visual output, or an extension of a touch-sensitive surface formed by a touchscreen). It should be noted that the another input control device controller 971 may be connected to any one or more of the foregoing devices. The display controller 973 in the I/O subsystem receives a signal from the display 940 and/or sends a signal to the display 940. After the display screen 940 detects user input, the display controller 973 converts the detected user input into interaction with a user interface object displayed on the display screen 940, to implement human-machine interaction. The sensor controller 972 may receive a signal from one or more sensors and/or send a signal to one or more sensors.

As a control center of the mobile phone, the processor 980 connects various parts of the entire mobile phone by using various interfaces and lines, and performs various functions of the mobile phone and processes data by running or executing the software program and/or the module stored in the memory 920 and by invoking data stored in the memory 920, to perform overall monitoring on the mobile phone. Optionally, the processor 980 may include one or more processing units. Preferably, an application processor and a modem processor may be integrated into the processor 980. The application processor mainly processes an operating system, a user interface, an application program, and the like. The modem processor mainly processes wireless communication. It may be understood that the modem processor may alternatively not be integrated into the processor 980.

The mobile phone further includes the power supply 990 (for example, a battery) for supplying power to the components. Preferably, the power supply 990 may be logically connected to the processor 980 by using a power 990 management system, to implement functions such as charging, discharging, and power consumption management by using the power 990 management system.

Although not shown in FIG. 32, the mobile phone may further include a Bluetooth module, and the like. Details are not described herein.

In the descriptions of this specification, the specific features, structures, materials, or characteristics may be combined in a proper manner in any one or more of the embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An antireflection film, comprising:
a plurality of convex structures comprising at least two adjacent convex structures and configured to form on at least one light transmission surface of an optical waveguide, wherein the at least two convex structures comprise a first convex structure and a second convex structure,
wherein the plurality of convex structures comprise first surfaces that are close to the light transmission surface,
wherein each of the plurality of convex structures comprises a respective first surface of the first surfaces,
wherein for each convex structure of the plurality of convex structures, a maximum radial length of the respective first surface of the convex structure is less than a minimum value of a visible light wavelength,
wherein for each convex structure of the plurality of convex structures, a maximum radial length of the convex structure decreases in a direction away from the light transmission surface,
wherein a height of each convex structure of the plurality of convex structures is greater than or equal to 310 nanometers (nm), and
wherein a distance between geometric centers of the respective first surface of the fist convex structure and the respective first surface of the second convex structure is less than or equal to 220 nm.

2. The antireflection film of claim 1, wherein the height is less than or equal to 450 nm, and wherein the distance is greater than or equal to 160 nm.

3. The antireflection film of claim 1, wherein the plurality of convex structures comprise second surfaces that are close to the light transmission surface, wherein each of the plurality of convex structures comprises a respective second surface of the second surfaces, and wherein for each convex structure of the plurality of convex structures, a maximum radial length of the respective second surface that is of each of the convex structure is zero times to 0.3 times the maximum radial length of the respective first surface of the convex structure.

4. The antireflection film of claim 1, wherein for each convex structure of the plurality of convex structures, a ratio of the height of the convex structure to the maximum radial length of the respective first surface of the convex structure is greater than or equal to 1 to 3.

5. The antireflection film of claim 1, wherein the convex structures are distributed in a dense stacking distribution manner.

6. The antireflection film of claim 1, wherein for each convex structure of the plurality of convex structures, the maximum radial length of the respective first surface that is of the convex structure is equal to the distance.

7. The antireflection film of claim 1, further comprising an adhesive layer located on the first surfaces, wherein a height of the adhesive layer is less than or equal to 10 nm.

8. The antireflection film of claim 7, wherein a difference between a refractive index of a material of the adhesive layer and a refractive index of a material of each of the convex structures is −0.2 to 0.2.

9. The antireflection film of claim 7, wherein a total light transmittance of the adhesive layer and a total light transmittance of each of the convex structures are greater than 90%.

10. An optical element, comprising:
an optical waveguide comprising at least one light transmission surface; and
an antireflection film located on the light transmission surface comprised in the optical waveguide and comprising:
a plurality of convex structures comprising at least two adjacent convex structures and formed on the light transmission surface, wherein the at least two convex structures comprise a first convex structure and a second convex structure,
wherein the plurality of convex structures comprise first surfaces that are close to the light transmission surface,
wherein each of the plurality of convex structures comprises a respective first surface of the first surfaces,
wherein for each convex structure of the plurality of convex structures, a maximum radial length of the respective first surface of the convex structure is less than a minimum value of a visible light wavelength,
wherein for each convex structure of the plurality of convex structures, a maximum radial length of the convex structure decreases in a direction away from the light transmission surface,
wherein a height of each convex structure of the plurality of convex structures is greater than or equal to 310 nanometers (nm), and
wherein a distance between geometric centers of the respective first surface of the first convex structure and the respective first surface of the second convex structure is less than or equal to 220 nm.

11. The optical element of claim 10, wherein a difference between a refractive index of a material of each of the convex structures and a refractive index of a material of the optical waveguide is −0.2 to 0.2.

12. The optical element of claim 10, wherein the antireflection film further comprises an adhesive layer, and wherein a difference between a refractive index of a material of the adhesive layer and a refractive index of a material of the optical waveguide is −0.2 to 0.2.

13. The optical element according to claim 10, wherein a maximum reflectivity of the optical element is less than or equal to 0.5% when an incident angle of a light ray is equal to zero degrees (°), and wherein the maximum reflectivity is less than or equal to 1% when the incident angle is greater than 0° and less than or equal to 40°.

14. The optical element of claim 10, wherein a total light transmittance of the optical waveguide and a total light transmittance of the antireflection film are greater than 90%.

15. The optical element of claim 10, wherein the light transmission surface is a curved light transmission surface or a flat light transmission surface.

16. The optical element of claim 10, wherein the optical waveguide is a protective diaphragm, a lens, or an infrared cut-off filter.

17. A terminal, comprising:
a camera comprising at least one optical element, wherein the optical element comprises:
an optical waveguide comprising at least one light transmission surface; and
an antireflection film located on the light transmission surface and comprising:
a plurality of convex structures comprising at least two adjacent convex structures and formed on the light transmission surface, wherein the at least two convex structures comprise a first convex structure and a second convex structure, wherein the plurality of convex structures comprise first surfaces that are close to the light transmission surface, wherein each of the plurality of convex structures comprises a respective first surface of the first surfaces, wherein for each convex structure of the plurality of convex structures, a maximum radial length of the respective first surface of the convex structure is less than a minimum value of a visible light wavelength, wherein for each convex structure of the plurality of convex structures, a maximum radial length of the convex structure decreases in a direction away from the light transmission surface, wherein a height of each convex structure of the plurality of convex structures is greater than or equal to 310 nanometers (nm), and wherein a distance between geometric centers of the respective first surface of the first convex structure and the respective first surface of the second convex structure is less than or equal to 220 nm.

18. The antireflection film of claim 7, wherein a total light transmittance of the adhesive layer is greater than 90%.

19. The antireflection film of claim 7, wherein a total light transmittance of each of the convex structures is greater than 90%.

20. The optical element of claim 10, wherein a total light transmittance of the optical waveguide or a total light transmittance of the antireflection film is greater than 90%.

* * * * *

UNITED STATES PATENT AND TRADEMARK OFFICE
CERTIFICATE OF CORRECTION

PATENT NO. : 12,085,692 B2
APPLICATION NO. : 17/606257
DATED : September 10, 2024
INVENTOR(S) : Haishui Ye, Feng Yu and Jun Yuan It is certified that error appears in the above-identified patent and that said Letters Patent is hereby corrected as shown below:

In the Claims

Claim 3, Column 43, Lines 41-42: "surface that is of each of the convex" should read "surface of the convex"

Claim 6, Column 43, Lines 55-56: "surface that is of the convex" should read "surface of the convex"

Claim 10, Column 44, Line 5: "surface comprised in the optical waveguide and" should read "surface and"

Signed and Sealed this
Eighth Day of October, 2024

Katherine Kelly Vidal
*Director of the United States Patent and Trademark Office*